US010790866B2

(12) United States Patent
Park et al.

(10) Patent No.: US 10,790,866 B2
(45) Date of Patent: Sep. 29, 2020

(54) ELECTRONIC DEVICE COMPRISING ANTENNA FOR WIRELESS COMMUNICATION

(71) Applicant: Samsung Electronics Co., Ltd., Suwon-si, Gyeonggi-do (KR)

(72) Inventors: Jungsik Park, Suwon-si (KR); Yoonjung Kim, Suwon-si (KR); Gyubok Park, Suwon-si (KR); Dongyeon Kim, Suwon-si (KR); Yonghwa Kim, Suwon-si (KR); Jinwoo Park, Suwon-si (KR); Jinho Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/705,795

(22) Filed: Dec. 6, 2019

(65) Prior Publication Data
US 2020/0186180 A1    Jun. 11, 2020

(30) Foreign Application Priority Data

Dec. 6, 2018    (KR) .......................... 10-2018-0156404

(51) Int. Cl.
*H04M 1/00* (2006.01)
*H04B 1/3827* (2015.01)
(Continued)

(52) U.S. Cl.
CPC ............. *H04B 1/3827* (2013.01); *H01Q 1/48* (2013.01); *H01Q 5/307* (2015.01);
(Continued)

(58) Field of Classification Search
CPC ........ H01Q 5/307; H01Q 1/48; H01Q 9/0407; H01Q 9/16; H04R 1/025; H04R 2499/11
(Continued)

(56) References Cited

U.S. PATENT DOCUMENTS 9,008,728 B2    4/2015  Abdul-Gaffoor et al.
9,806,422 B2   10/2017  Garcia et al.
(Continued)

FOREIGN PATENT DOCUMENTS

DE    20 2017 004 887 U1    1/2018
EP         2 975 695 A1      1/2016

OTHER PUBLICATIONS

International Search Report dated Apr. 2, 2020, issued in International Patent Application No. PCT/KR2019/017147.
(Continued)

*Primary Examiner* — Sonny Trinh
(74) *Attorney, Agent, or Firm* — Jefferson IP Law, LLP

(57) ABSTRACT

An electronic device is provided. The electronic device includes a front plate disposed on a display, a back plate disposed on a back surface of the electronic device, a side member placed between the front plate and the back plate and forming an outer appearance of the electronic device together with the front plate and the back plate, and first, second, and third antenna modules including a plurality of conductive plates configured to transmit/receive a signal in a specified first frequency band and disposed between the front plate and the back plate so as to be adjacent to the side member. At least a portion of the side member is able to be used as an antenna of a signal in a specified second frequency band different from the specified first frequency band.

20 Claims, 18 Drawing Sheets

(51) Int. Cl.
*H01Q 9/04* (2006.01)
*H01Q 9/16* (2006.01)
*H01Q 5/307* (2015.01)
*H04R 1/02* (2006.01)
*H01Q 1/48* (2006.01)

(52) U.S. Cl.
CPC ............ *H01Q 9/0407* (2013.01); *H01Q 9/16* (2013.01); *H04R 1/025* (2013.01); *H04R 2499/11* (2013.01)

(58) Field of Classification Search
USPC .................................. 455/90.2, 562.1, 575.7
See application file for complete search history.

(56) References Cited

U.S. PATENT DOCUMENTS

| | | | |
|---|---|---|---|
| 9,819,098 B2 | 11/2017 | Gu et al. | |
| 9,900,894 B2 | 2/2018 | Jung et al. | |
| 9,917,368 B2 | 3/2018 | Garcia et al. | |
| 10,122,401 B2 | 11/2018 | Youn et al. | |
| 10,297,906 B2 | 5/2019 | Lee et al. | |
| 10,340,588 B2 * | 7/2019 | Sudo | H01Q 1/12 |
| 10,461,794 B2 | 10/2019 | Youn et al. | |
| 10,587,040 B2 * | 3/2020 | Sudo | H01Q 1/42 |
| 2013/0293424 A1 | 11/2013 | Zhu et al. | |
| 2014/0141731 A1 | 5/2014 | Abdul-Gaffoor et al. | |
| 2015/0155614 A1 | 6/2015 | Youn et al. | |
| 2017/0230073 A1 | 8/2017 | Youn et al. | |
| 2017/0273090 A1 | 9/2017 | Jung et al. | |
| 2017/0317418 A1 | 11/2017 | Garcia et al. | |
| 2018/0026341 A1 | 1/2018 | Mow et al. | |
| 2018/0041239 A1 | 2/2018 | Youn et al. | |
| 2018/0076526 A1 | 3/2018 | Garcia et al. | |
| 2018/0090816 A1 | 3/2018 | Mow et al. | |
| 2018/0323496 A1 | 11/2018 | Lee et al. | |
| 2019/0173160 A1 | 6/2019 | Mow et al. | |
| 2019/0237855 A1 | 8/2019 | Lee et al. | |
| 2019/0319341 A1 * | 10/2019 | Park | H01Q 21/065 |
| 2019/0327834 A1 * | 10/2019 | Kim | H01Q 1/243 |
| 2020/0014095 A1 | 1/2020 | Mow et al. | |
| 2020/0036083 A1 * | 1/2020 | Kim | H01Q 1/38 |
| 2020/0036103 A1 * | 1/2020 | Ariumi | H01Q 21/0025 |

OTHER PUBLICATIONS

Extended European Search Report dated May 7, 2020, issued in European Patent Application No. 19214213.1.

* cited by examiner

ELECTRONIC DEVICE COMPRISING ANTENNA FOR WIRELESS COMMUNICATION

CROSS-REFERENCE TO RELATED APPLICATION(S)

This application is based on and claims priority under 35 U.S.C. § 119(a) of a Korean patent application number 10-2018-0156404, filed on Dec. 6, 2018, in the Korean Intellectual Property Office, the disclosure of which is incorporated by reference herein in its entirety.

BACKGROUND

1. Field

The disclosure relates to an electronic device including an antenna for wireless communication.

2. Description of Related Art

As mobile communication technologies develop, an electronic device, which is equipped with an antenna, such as a smartphone, a wearable device, or the like is being widely supplied. The electronic device may receive or transmit a signal including data (e.g., a message, a photo, a video, a music file, a game, and the like) through the antenna. In the electronic device, a signal that is received by using the antenna is provided to a radio frequency integrated circuit (RFIC).

The antenna of the electronic device is implemented by using a plurality of antenna elements for the purpose of receiving or transmitting a signal more efficiently. For example, the electronic device may include one or more antenna arrays, in each of which a plurality of antenna elements are arranged in a regular shape. The antenna array has an effective isotropically radiated power (EIRP) greater than one antenna element. As such, the electronic device that includes the antenna array may receive or transmit a signal efficiently.

The above information is presented as background information only to assist with an understanding of the disclosure. No determination has been made, and no assertion is made, as to whether any of the above might be applicable as prior art with regard to the disclosure.

SUMMARY

To improve the throughput, $5^{th}$ generation (5G) mobile communication may use a wireless signal in a relatively high frequency band compared to $4^{th}$ generation (4G) mobile communication. Because a physical characteristic of an antenna varies depending on a frequency of a signal, different antennas may be used depending on frequency bands to be used. For example, an electronic device may use different antennas with respect to a signal having a center frequency less than approximately 6 GHz and a signal having a center frequency of approximately 6 GHz or higher. In the case of the signal having the center frequency of approximately 6 GHz or higher, the electronic device may transmit/receive a wireless signal by using an antenna module in which a portion of a radio frequency (RF) circuit is integrated with an antenna.

To receive a high frequency signal (e.g., a signal having a center frequency of approximately 6 GHz or higher), a plurality of antenna modules may be disposed at the electronic device such that the receive coverage of the electronic device covers all directions (i.e., omnidirection) of the electronic device. Due to the miniaturization and multi-function of the electronic device, the electronic device may have a limited mounting space. Accordingly, the number of antenna modules capable of being mounted at the electronic device may also be limited.

Aspects of the disclosure are to address at least the above-mentioned problems and/or disadvantages and to provide at least the advantages described below. Accordingly, an aspect of the disclosure is to provide an electronic device having an optimized coverage.

Additional aspects will be set forth in part in the description which follows and, in part, will be apparent from the description, or may be learned by practice of the presented embodiments.

In accordance with an aspect of the disclosure, an electronic device is provided. The electronic device includes a display disposed on a front surface of the electronic device and a front plate disposed on the display, a back plate that is disposed on a back surface of the electronic device, a side member that is placed between the front plate and the back plate and forms an outer appearance of the electronic device together with the front plate and the back plate, a first antenna module that includes a plurality of first patch antenna elements and a plurality of first dipole antenna elements configured to transmit/receive a signal in a first frequency band and is placed adjacent to the side member and on an upper portion of the electronic device such that the plurality of first patch antenna elements face the back plate, a second antenna module that includes a plurality of second patch antenna elements configured to transmit/receive the signal in the first frequency band and is placed adjacent to the side member such that the plurality of second patch antenna elements face a left side of the electronic device when viewing the electronic device from the back surface, and a third antenna module that includes a plurality of third patch antenna elements configured to transmit/receive the signal in the first frequency band and is placed adjacent to the side member such that the plurality of third patch antenna elements face a right side of the electronic device when viewing the electronic device from the back surface.

In accordance with another aspect of the disclosure, an electronic device is provided. The electronic device includes a display disposed on a front surface of the electronic device and a front plate disposed on the display, a back plate that is disposed on a back surface of the electronic device, a side member that is placed between the front plate and the back plate and forms an outer appearance of the electronic device together with the front plate and the back plate, a first antenna module that includes a plurality of first patch antenna elements and a plurality of first dipole antenna elements configured to transmit/receive a signal in a first frequency band and is placed adjacent to a speaker placed on an upper middle of the electronic device when viewed from the back surface of the electronic device, a second antenna module that includes a plurality of second patch antenna elements configured to transmit/receive the signal in the first frequency band and is placed adjacent to the side member and on an upper left of the electronic device when viewed from the back surface of the electronic device, and a third antenna module that includes a plurality of third patch antenna elements configured to transmit/receive the signal in the first frequency band and is placed on a lower right of the electronic device and between a battery and the side member when viewing the electronic device from the back surface, the plurality of second patch antenna elements may be disposed to transmit/receive a wireless signal toward a left side of the electronic device when viewing the electronic device from the back surface, and the plurality of third patch antenna elements may be disposed to transmit/receive a wireless signal toward a right side of the electronic device when viewing the electronic device from the back surface.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
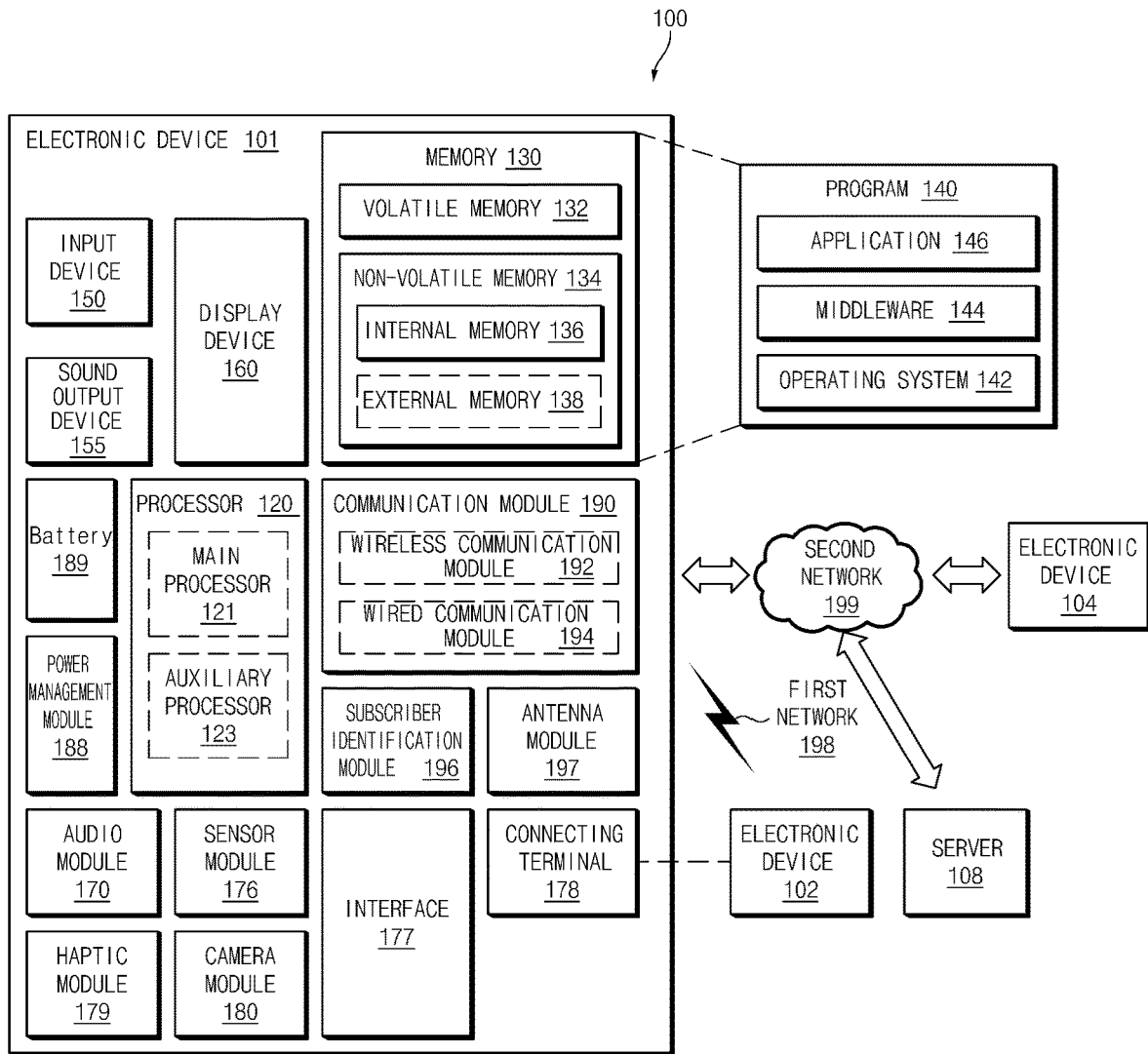
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
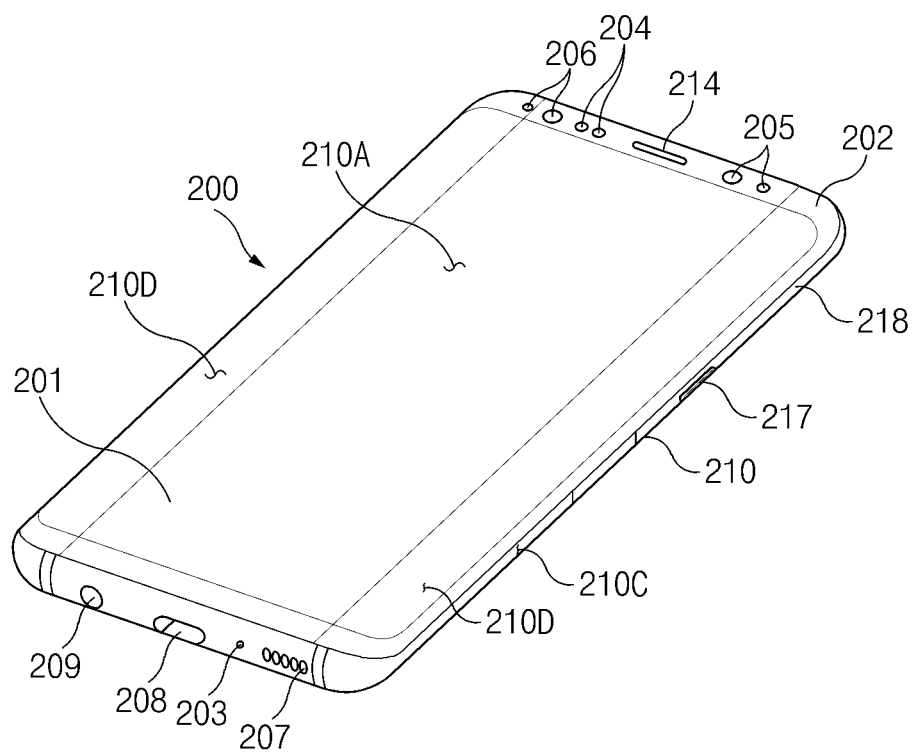
FIG. 2 is a front perspective view of a mobile electronic device according to an embodiment of the disclosure.

FIG. 2 is a front perspective view of a mobile electronic device according to an embodiment of the disclosure.

Figure 3:
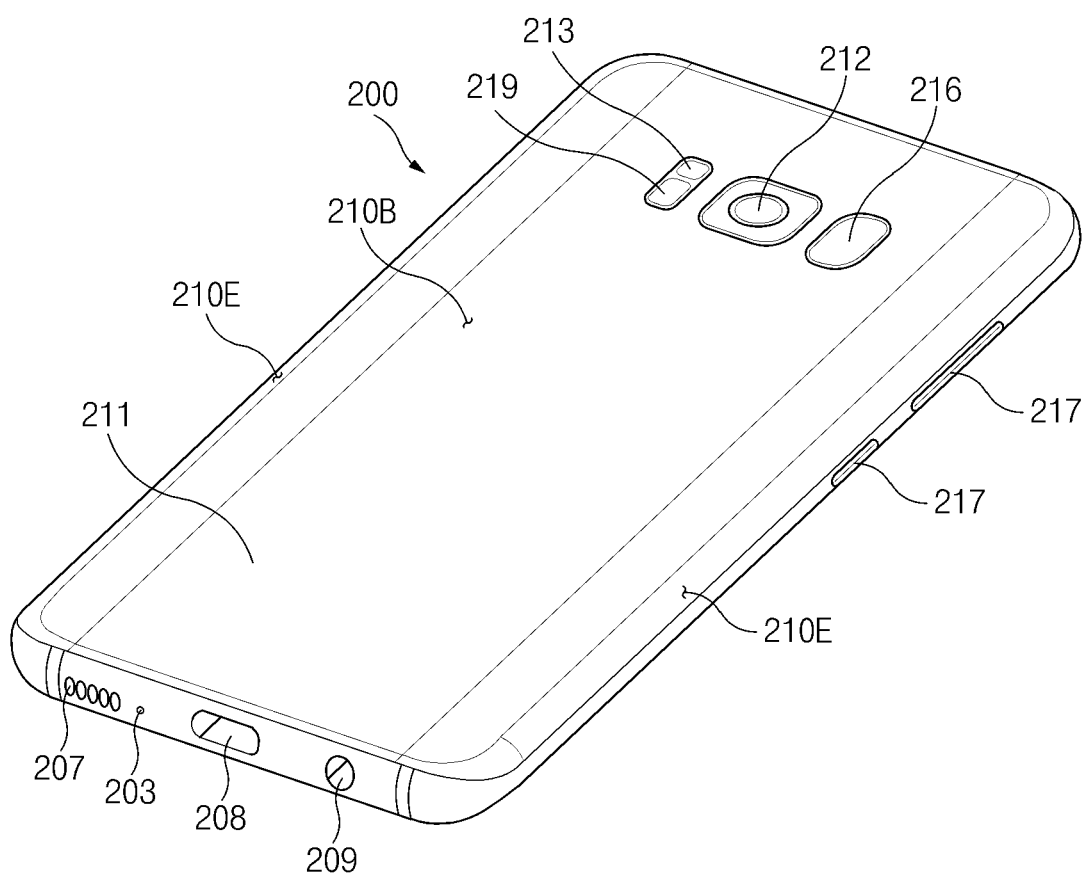
FIG. 3 is a rear perspective view of an electronic device of FIG. 2 according to an embodiment of the disclosure.

FIG. 3 is a rear perspective view of an electronic device of FIG. 2 according to an embodiment of the disclosure.

Referring to FIGS. 2 and 3, an electronic device 200 (e.g., the electronic device 101 of FIG. 1) according to an embodiment may include a housing 210 that includes a first surface (or a front surface) 210A, a second surface (or a back surface) 210B, and a side surface 210C surrounding a space between the first surface 210A and the second surface 210B. In another embodiment (not illustrated), a housing may refer to a structure that forms a portion of the first surface 210A, the second surface 210B, and the side surface 210C of FIG. 2. According to an embodiment, the first surface 210A may be formed by a front plate 202 (e.g., a glass plate including various coating layers, or a polymer plate), of which at least a portion is substantially transparent. The second surface 210B may be formed by a back plate 211 that is substantially opaque. For example, the back plate 211 may be formed by a coated or colored glass, a ceramic, a polymer, a metal (e.g., aluminum, stainless steel (STS), or magnesium), or a combination of at least two of the materials. The side surface 210C may be coupled to the front plate 202 or the back plate 211 and may be formed by a side bezel structure (or a "side member") 218 including a metal and/or a polymer. In an embodiment, the back plate 211 and the side bezel structure 218 may be integrally formed and may include the same material (e.g., a metal material such as aluminum).

In the embodiment that is illustrated, the front plate 202 may include two first regions 210D, which are bent toward the back plate 211 from the first surface 210A so as to be seamlessly extended, at opposite long edges of the front plate 202. In the embodiment (refer to FIG. 3) that is illustrated, the back plate 211 may include two second regions 210E, which are bent toward the front plate 202 from the second surface 210B so as to be seamlessly extended, at opposite long edges thereof. In an embodiment, the front plate 202 (or the back plate 211) may include only one of the first regions 210D (or the second regions 210E). In another embodiment, a portion of the first regions 210D or the second regions 210E may not be included. In the embodiments, when viewed from a side surface of the electronic device 200, the side bezel structure 218 may have a first thickness (or width) on one side where the first regions 210D or the second regions 210E are not included, and may have a second thickness, which is smaller than the first thickness, on one side where the first regions 210D or the second regions 210E are included.

According to an embodiment, the electronic device 200 may include at least one or more of a display 201, an audio module (203, 207, 214), a sensor module (204, 216, 219), a camera module (205, 212, 213), key input devices 217, a light-emitting device 206, and a connector hole (208, 209). In an embodiment, the electronic device 200 may not include at least one (e.g., the key input devices 217 or the light-emitting device 206) of the components or may further include any other component.

The display 201 may be exposed through a considerable portion of the front plate 202, for example. In an embodiment, at least a portion of the display 201 may be exposed through the first surface 210A, and the front plate 202 forming the first regions 210D of the side surface 210C. In an embodiment, a corner of the display 201 may be formed to be mostly identical to a shape of an outer portion of the front plate 202 adjacent thereto. In another embodiment (not illustrated), to increase the area where the display 201 is exposed, a difference between the outer portion of the display 201 and an outer portion of the front plate 202 may be formed mostly identically.

In another embodiment (not illustrated), a recess or an opening may be formed at a portion of a screen display region of the display 201, and at least one or more of the audio module 214, the sensor module 204, the camera module 205, and the light-emitting device 206 may be provided to be aligned with the recess or the opening. In another embodiment (not illustrated), at least one or more of the audio module 214, the sensor module 204, the camera module 205, the fingerprint sensor 216, and the light-emitting device 206 may be provided on a back surface of the display 201, which corresponds to the screen display region. In another embodiment (not illustrated), the display 201 may be coupled to a touch sensing circuit, a pressure sensor capable of measuring the intensity (or pressure) of a touch, and/or a digitizer capable of detecting a magnetic stylus pen or may be disposed adjacent thereto. In an embodiment, at least a portion of the sensor module (204, 219) and/or at least a portion of the key input devices 217 may be disposed in the first regions 210D and/or the second regions 210E.

The audio module (203, 207, 214) may include the microphone hole 203 and the speaker hole (207, 214). A microphone for obtaining external sound may be disposed within the microphone hole 203. In an embodiment, a plurality of microphones may be disposed to detect a direction of sound. The speaker hole (207, 214) may include the external speaker hole 207 and the receiver hole 214 for call. In an embodiment, the speaker hole (207, 214) and the microphone hole 203 may be implemented with one hole, or a speaker (e.g., a piezo speaker) may be included without the speaker hole (207, 214).

The sensor module (204, 216, 219) may generate an electrical signal or a data value that corresponds to an internal operation state of the electronic device 200 or corresponds to an external environment state. The sensor module (204, 216, 219) may include, for example, the first sensor module 204 (e.g., a proximity sensor) and/or a second sensor module (not illustrated) (e.g., a fingerprint sensor) disposed on the first surface 210A of the housing 210, and/or the third sensor module 219 (e.g., a hear rate monitor (HRM) sensor) and/or the fourth sensor module 216 (e.g., a fingerprint sensor) disposed on the second surface 210B of the housing 210. The fingerprint sensor may be disposed on the second surface 210B as well as the first surface 210A (e.g., a home key button, not shown) of the housing 210. The electronic device 200 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illumination sensor 204.

The camera module (205, 212, 213) may include the first camera device 205 disposed on the first surface 210A of the electronic device 200, and the second camera device 212 and/or the flash 213 disposed on the second surface 210B. The camera devices 205 and 212 may include one or more lenses, an image sensor, and/or an image signal processor. The flash 213 may include, for example, a light-emitting diode or a xenon lamp. In an embodiment, two or more lenses (e.g., an infrared camera and wide-angle and telephoto lenses) and image sensors may be disposed on one surface of the electronic device 200.

The key input devices 217 may be disposed on the side surface 210C of the housing 210. In another embodiment, the electronic device 200 may not include all or a part of the key input devices 217, and a key input device not included may be implemented on the display 201 in the form of a soft key. In an embodiment, a key input device may include the sensor module 216 disposed on the second surface 210B of the housing 210.

The light-emitting device 206 may be disposed, for example, on the first surface 210A of the housing 210. The light-emitting device 206 may provide status information of the electronic device 200, for example, in the form of light. In another embodiment, the light-emitting device 206 may provide, for example, a light source that operates in conjunction with an operation of the camera module 205. The light-emitting device 206 may include, for example, a light-emitting diode (LED), an IR LED, and a xenon lamp.

The connector hole (208, 209) may include the first connector hole 208 that is able to accommodate a connector (e.g., a USB connector) for transmitting/receiving a power and/or data with an external electronic device, and/or the second connector hole (or an earphone jack) 209 that is able to accommodate a connector for transmitting/receiving an audio signal with the external electronic device.

Figure 4:
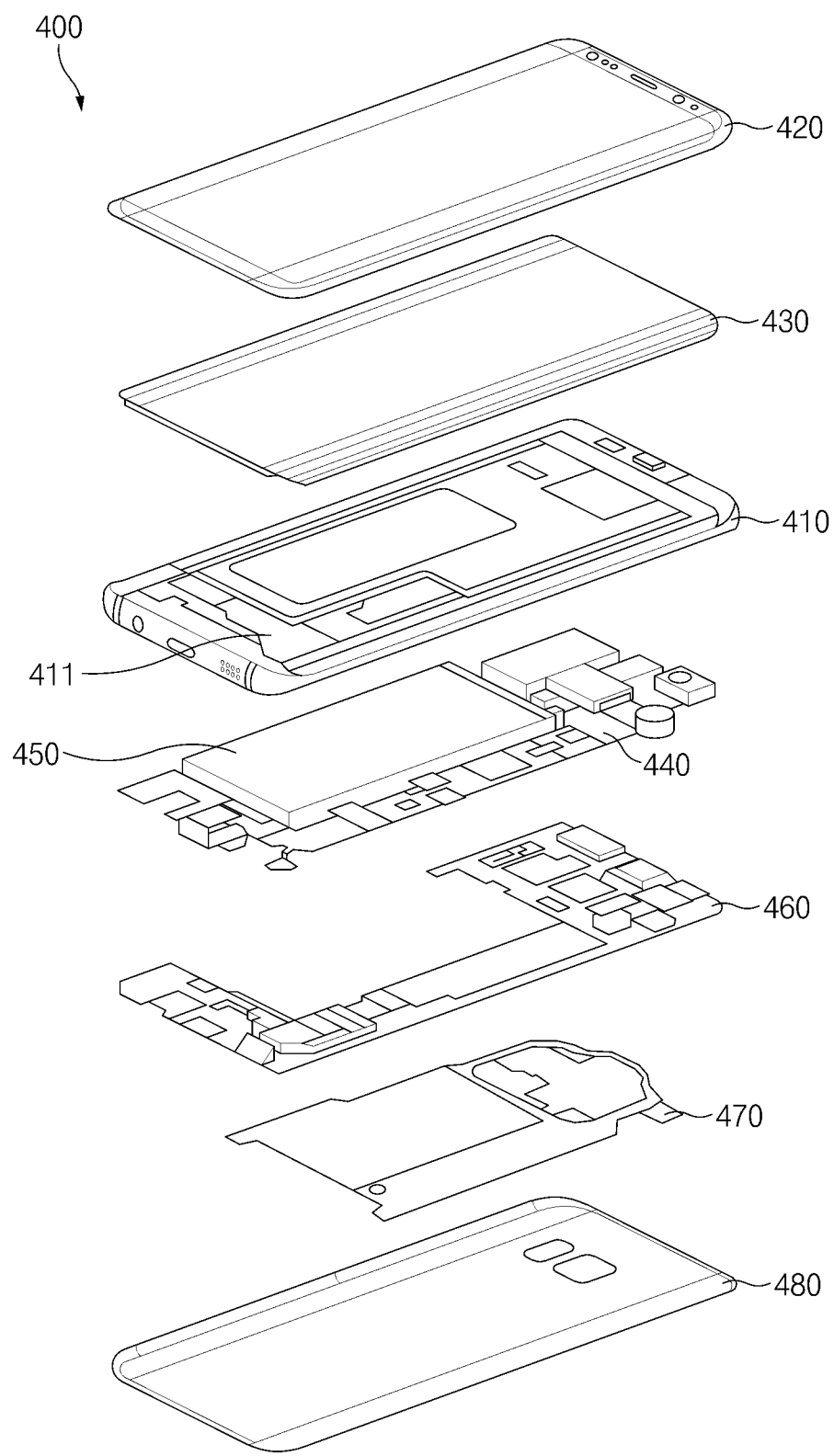
FIG. 4 is an exploded perspective view of an electronic device of FIG. 2 according to an embodiment of the disclosure.

FIG. 4 is an exploded perspective view of an electronic device of FIG. 2 according to an embodiment of the disclosure.

Referring to FIG. 4, an electronic device 400 may include a side bezel structure 410, a first support member 411 (e.g., a bracket), a front plate 420, a display 430, a printed circuit board 440, a battery 450, a second support member 460 (e.g., a rear case), an antenna 470, and a back plate 480. In an embodiment, the electronic device 400 may not include at least one (e.g., the first support member 411 or the second support member 460) of the components or may further include any other component. At least one of the components of the electronic device 400 may be identical or similar to at least one of the components of the electronic device 200 of FIG. 2 or 3, and thus, additional description will be omitted to avoid redundancy.

The first support member 411 may disposed within the electronic device 400 so as to be connected with the side bezel structure 410 or may be integrally formed with the side bezel structure 410. The first support member 411 may be formed of, for example, a metal material and/or a nonmetal material (e.g., polymer). The display 430 may be coupled to one surface of the first support member 411, and the printed circuit board 440 may be coupled to an opposite surface of the first support member 411. A processor, a memory, and/or an interface may be mounted on the printed circuit board 440. For example, the processor may include one or more of a central processing unit, an application processor, a graphic processing device, an image signal processor, a sensor hub processor, or a communication processor.

The memory may include, for example, a volatile memory or a nonvolatile memory.

The interface may include, for example, an HDMI, a USB interface, an SD card interface, and/or an audio interface. The interface may electrically or physically connect, for example, the electronic device 400 with an external electronic device and may include a USB connector, an SD card/MMC connector, or an audio connector.

The battery 450 is a device for supplying a power to at least one component of the electronic device 400 and may include, for example, a primary cell incapable of being recharged, a secondary cell capable of being recharged, or a fuel cell. At least a portion of the battery 450 may be disposed on substantially the same plane as the printed circuit board 440, for example. The battery 450 may be integrally disposed within the electronic device 400, or may be disposed to be removable from the electronic device 400.

The antenna 470 may be disposed between the back plate 480 and the battery 450. The antenna 470 may include, for example, a near field communication (NFC) antenna, an antenna for wireless charging, and/or a magnetic secure transmission (MST) antenna. For example, the antenna 470 may perform short range communication with an external device or may wirelessly transmit/receive a power necessary to charge. In another embodiment, an antenna structure may be formed by a portion of the side bezel structure 410 and/or the first support member 411, or by a combination thereof.

Figure 5:
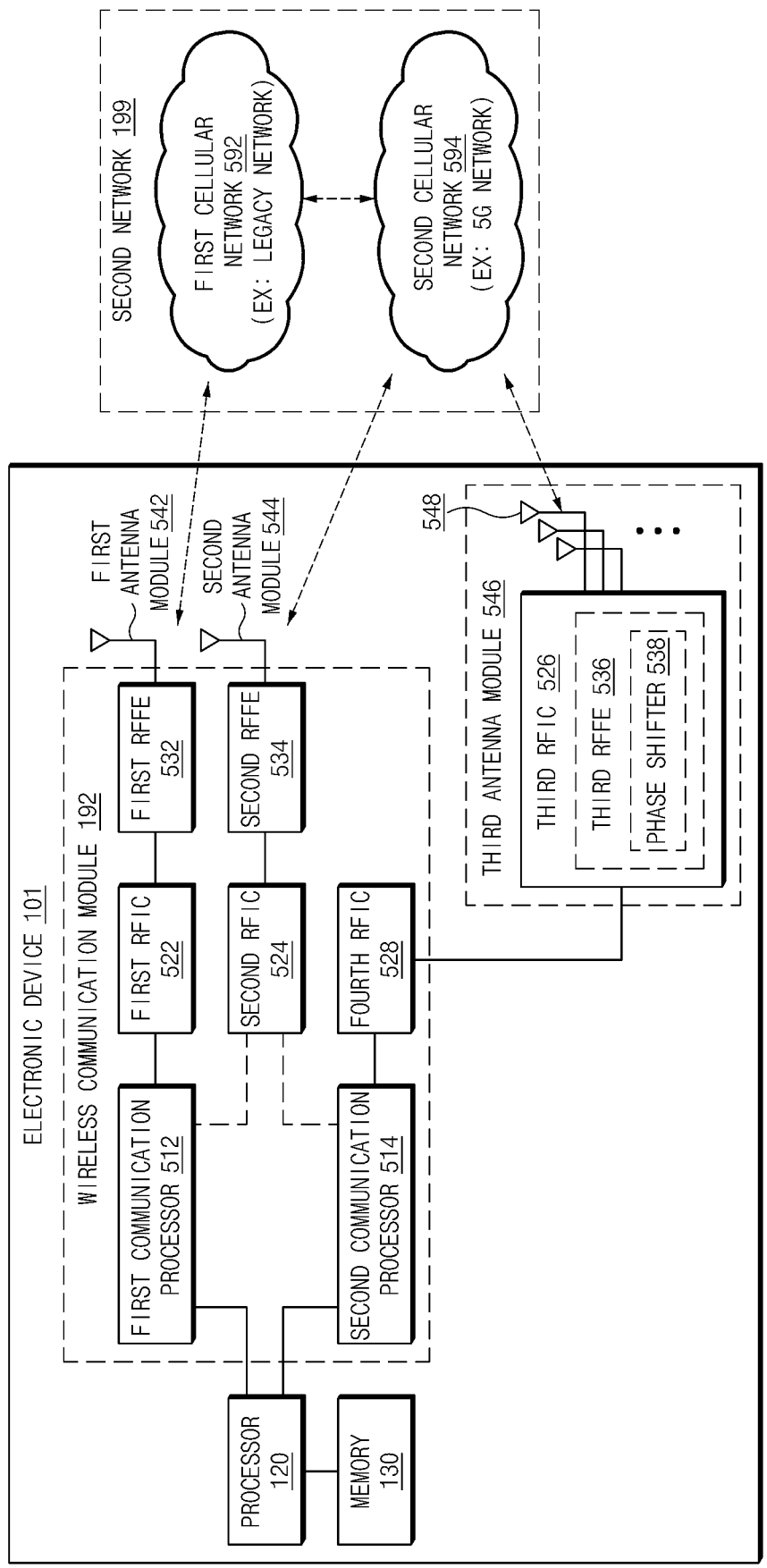
FIG. 5 is a block diagram of an electronic device in a network environment including a plurality of cellular networks, according to an embodiment of the disclosure.

FIG. 5 is a block diagram of an electronic device in a network environment including a plurality of cellular networks, according to an embodiment of the disclosure.

Referring to FIG. 5, the electronic device 101 may include a first communication processor 512, a second communication processor 514, a first radio frequency integrated circuit (RFIC) 522, a second RFIC 524, a third RFIC 526, a fourth RFIC 528, a first radio frequency front end (RFFE) 532, a second RFFE 534, a first antenna module 542, a second antenna module 544, and an antenna 548. The electronic device 101 may further include the processor 120 and the memory 130. The second network 199 may include a first cellular network 592 and a second cellular network 594. For example, the first cellular network 592 and the second cellular network 594 may be physically distinguished. For another example, the first cellular network 592 and the second cellular network 594 may be logically distinguished. According to another embodiment, the electronic device 101 may further include at least one component of the components illustrated in FIG. 1, and the second network 199 may further include at least another network. According to an embodiment, the first communication processor 512, the second communication processor 514, the first RFIC 522, the second RFIC 524, the fourth RFIC 528, the first RFFE 532, and the second RFFE 534 may form at least a portion of the wireless communication module 192. According to another embodiment, the fourth RFIC 528 may be omitted or may be included as a portion of the third RFIC 526.

The first communication processor 512 may establish a communication channel for a band to be used for wireless communication with the first cellular network 592 and may support legacy network communication through the established communication channel. According to various embodiments, the first cellular network 592 may be a legacy network including a $2^{nd}$ generation (2G), a $3^{rd}$ generation (3G), a 4G, or a long term evolution (LTE) network. The second communication processor 514 may establish a communication channel corresponding to a specified band (e.g., ranging from approximately 6 GHz to approximately 60 GHz) of bands to be used for wireless communication with the second cellular network 594 and may support 5G network communication through the established communication channel. According to various embodiments, the second cellular network 594 may be a 5G network defined in the 3rd generation partnership project (3GPP). Additionally, according to an embodiment, the first communication processor 512 or the second communication processor 514 may establish a communication channel corresponding to another specified band (e.g., approximately 6 GHz or lower) of the bands to be used for wireless communication with the second cellular network 594 and may support 5G network communication through the established communication channel. According to an embodiment, the first communication processor 512 and the second communication processor 514 may be implemented in a single chip or a single package. According to various embodiments, the first communication processor 512 or the second communication processor 514 may be implemented in a single chip or a single package together with the processor 120, the auxiliary processor 123, or the communication module 190. According to an embodiment, the first communication processor 512 and the second communication processor 514 may be directly or indirectly connected by an interface (not illustrated) and may provide or receive data or a control signal in one direction or in opposite directions.

In the case of transmitting a signal, the first RFIC 522 may convert a baseband signal generated by the first communication processor 512 into a radio frequency (RF) signal of approximately 700 MHz to approximately 3 GHz that is used in the first cellular network 592 (e.g., a legacy network). In the case of receiving a signal, an RF signal may be obtained from the first cellular network 592 (e.g., a legacy network) through an antenna (e.g., the first antenna module 542) and may be preprocessed through an RFFE (e.g., the first RFFE 532). The first RFIC 522 may convert the preprocessed RF signal into a baseband signal so as to be processed by the first communication processor 512.

In the case of transmitting a signal, the second RFIC 524 may convert a baseband signal generated by the first communication processor 512 or the second communication processor 514 into an RF signal (hereinafter referred to as a "5G Sub6 RF signal") in a Sub6 band (e.g., approximately 6 GHz or lower). In the case of receiving a signal, the 5G Sub6 RF signal may be obtained from the second cellular network 594 (e.g., a 5G network) through an antenna (e.g., the second antenna module 544) and may be preprocessed through an RFFE (e.g., the second RFFE 534). The second RFIC 524 may convert the preprocessed 5G Sub6 RF signal into a baseband signal so as to be processed by a communication processor corresponding to the 5G Sub6 RF signal from among the first communication processor 512 or the second communication processor 514.

The third RFIC 526 may convert a baseband signal generated by the second communication processor 514 into an RF signal (hereinafter referred to as a "5G Above6 RF signal") in a 5G Above6 band (e.g., approximately 6 GHz to approximately 60 GHz) to be used in the second cellular network 594 (e.g., a 5G network). In the case of receiving a signal, the 5G Above6 RF signal may be obtained from the second cellular network 594 (e.g., a 5G network) through an antenna (e.g., the antenna 548) and may be preprocessed through a third RFFE 536. The third RFIC 526 may convert the preprocessed 5G Above6 RF signal into a baseband signal so as to be processed by the second communication processor 514. According to an embodiment, the third RFFE 536 may be implemented as a portion of the third RFIC 526.

According to an embodiment, the electronic device 101 may include the fourth RFIC 528 independently of the third RFIC 526 or as at least a portion of the third RFIC 526. In this case, the fourth RFIC 528 may convert a baseband signal generated by the second communication processor 514 into an RF signal (hereinafter referred to as an "IF signal") in an intermediate frequency band (e.g., ranging from approximately 9 GHz to approximately 11 GHz) and may provide the IF signal to the third RFIC 526. The third RFIC 526 may convert the IF signal into the 5G Above6 RF signal. In the case of receiving a signal, the 5G Above6 RF signal may be received from the second cellular network 594 (e.g., a 5G network) through an antenna (e.g., the antenna 548) and may be converted into an IF signal by the third RFIC 526. The fourth RFIC 528 may convert the IF signal into a baseband signal so as to be processed by the second communication processor 514.

According to an embodiment, the first RFIC 522 and the second RFIC 524 may be implemented with a single chip or at least a portion of a single package. According to an embodiment, the first RFFE 532 and the second RFFE 534 may be implemented with a single chip or at least a portion of a single package. According to an embodiment, at least one of the first antenna module 542 or the second antenna module 544 may be omitted or may be combined with any other antenna module to process RF signals in a plurality of bands.

According to an embodiment, the third RFIC 526 and the antenna 548 may be disposed at the same substrate to form a third antenna module 546. For example, the wireless communication module 192 or the processor 120 may be disposed at a first substrate (e.g., a main PCB). In this case, the third RFIC 526 may be disposed at a partial region (e.g., on a lower surface) of a second substrate (e.g., a sub PCB) independent of the first substrate, the antenna 548 may be disposed at another partial region (e.g., on an upper surface) of the second substrate, and the third RFIC 526 may be implemented with the third RFIC 526 and the antenna 548 thus disposed. As the third RFIC 526 and the antenna 548 are disposed at the same substrate, it may be possible to decrease a length of a transmission line between the third RFIC 526 and the antenna 548. The decrease in the transmission line may make it possible to reduce the loss (or attenuation) of a signal in a high-frequency band (e.g., ranging from approximately 6 GHz to approximately 60 GHz) used for the 5G network communication due to the transmission line. As such, the electronic device 101 may improve the quality or speed of communication with the second cellular network 594 (e.g., a 5G network).

According to an embodiment, the antenna 548 may be formed of an antenna array that includes a plurality of antenna elements capable of being used for beamforming. In this case, the third RFIC 526 may include, for example, a plurality of phase shifters 538 corresponding to the plurality of antenna elements as a portion of the third RFFE 536. In the case of transmitting a signal, each of the plurality of phase shifters 538 may shift a phase of the 5G Above6 RF signal to be transmitted to the outside (e.g., a base station of a 5G network) of the electronic device 101 through the corresponding antenna element. In the case of receiving a signal, each of the plurality of phase shifters 538 may shift a phase of the 5G Above6 RF signal received from the outside through the corresponding antenna element to the same or substantially the same phase. This may enable the transmission or reception between the electronic device 101 and the outside through the beamforming.

The second cellular network 594 (e.g., a 5G network) may be used independently of the first cellular network 592 (e.g., a legacy network) (e.g., stand-alone (SA)) or may be used in conjunction with the first cellular network 592 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 130 so as to be accessed by any other component (e.g., the processor 120, the first communication processor 512, or the second communication processor 514).

Figure 6:
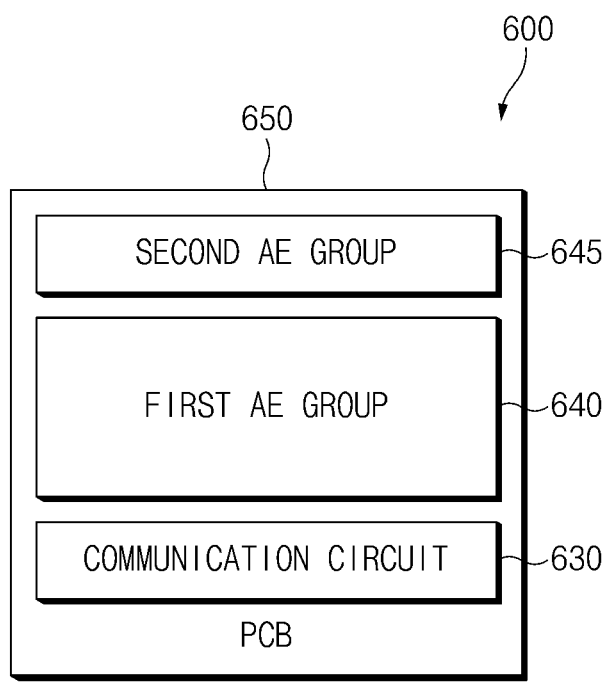
FIG. 6 illustrates a block diagram of an antenna module according to an embodiment of the disclosure.

FIG. 6 illustrates a block diagram of an antenna module according to an embodiment of the disclosure.

Referring to FIG. 6, an antenna module 600 (e.g., the third antenna module 546 of FIG. 5) may include a communication circuit 630 (e.g., the third RFIC 526 of FIG. 5) disposed on a printed circuit board (PCB) 650, the PCB 650, at least one antenna element (AE) group (e.g., a first AE group 640), and/or a second AE group 645. For example, the first AE group 640 and the second AE group 645 may be respectively referred to as a "first antenna array" and a "second antenna array". For example, each of antenna elements (e.g., conductive plates) included in the first AE group 640 and/or the second AE group 645 may be referred to as an "antenna" (e.g., at least a portion of the antenna 548 of FIG. 5). For example, in the case where at least some of the antenna elements included in the first AE group 640 and/or the second AE group 645 are simultaneously used in a beamforming operation, at least some antenna elements used in the beamforming operation from among the antenna elements may operate as one array antenna. In this case, the array antenna may form a beam having directivity in at least one specified direction.

According to an embodiment, the first AE group 640 or the second AE group 645 may be disposed on a first surface of the PCB 650, and the communication circuit 630 (e.g., the third RFIC 526 of FIG. 5) may be disposed on a second surface of the PCB 650. The PCB 650 may include a coaxial cable connector or a board to board (B-to-B) connector for electrical connection with another PCB (e.g., the printed circuit board 440 or the second support member 460 of FIG. 4) by using a transmission line.

According to an embodiment, the first AE group 640 or the second AE group 645 may include a plurality of conductive plates (e.g., antenna elements). Each of the plurality of antenna elements may include a patch antenna, a shorted patch antenna, a loop antenna, a notch antenna, a slot antenna, or a dipole antenna. According to an embodiment, a plurality of antenna elements belonging to the first AE group 640 may form one array antenna. For example, the antenna module 600 may perform beamforming by using the antenna elements of the first AE group 640. According to an embodiment, a plurality of antenna elements belonging to the second AE group 645 may form one array antenna. For example, the communication circuit 630 may perform beamforming by using the antenna elements (e.g., patch antennas) of the second AE group 645. According to an embodiment, the communication circuit 630 may perform beamforming by using the antenna elements of the first AE group 640 and the second AE group 645. According to an embodiment, each of the antenna elements belonging to the second AE group 645 may operate as a single antenna. For example, each of the antenna elements included in the second AE group 645 may be a dipole antenna.

According to an embodiment, at least a portion of the PCB 650 may be implemented with a flexible PCB. For example, the PCB 650 may include a plurality of PCBs, and at least some of the plurality of PCBs may be a flexible PCB (FPCB). According to an embodiment, the first AE group 640 and the second AE group 645 may be placed on different PCBs. For example, a PCB on which the first AE group 640 and a PCB on which the second AE group 645 is positioned may be physically and/or electrically connected through an FPCB.

Each of the antenna elements included in the first AE group 640 and the second AE group 645 may be referred to as a "conductive plate" or a "conductive pattern".

Figure 7:
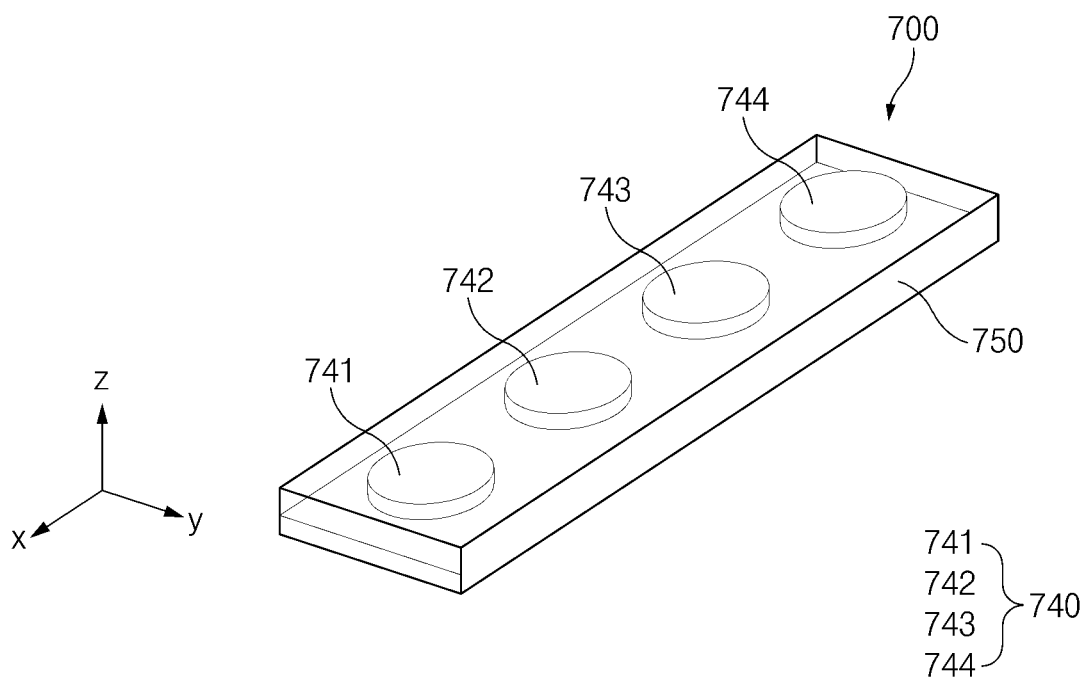
FIG. 7 is a front perspective view of an antenna module according to an embodiment of the disclosure.

FIG. 7 is a front perspective view of an antenna module according to an embodiment of the disclosure.

Referring to FIG. 7, according to an embodiment, an antenna module 700 may include a first AE group 740 (e.g., the first AE group 640 of FIG. 6) disposed on a front surface of a PCB 750 (e.g., the PCB 650 of FIG. 6) (e.g., in a direction being parallel to an X-Y plane and facing a positive direction of a Z-axis). The antenna module 700 may include at least one communication circuit (not illustrated) (e.g., the communication circuit 630 of FIG. 6) disposed on a back surface of the PCB 750 (e.g., in a direction being parallel to the X-Y plane and facing a negative direction of the Z-axis).

According to an embodiment, the first AE group 740 may include a plurality of patch antenna elements 741, 742, 743, and 744. Each of the plurality of patch antenna elements 741, 742, 743, and 744 may be connected with a transmission line through at least one feeding point. For example, each of the plurality of patch antenna elements 741, 742, 743, and 744 may be connected to the communication circuit through at least one transmission line that is formed at the interior of the PCB 750.

According to an embodiment, each of the plurality of patch antenna elements 741, 742, 743, and 744 may transmit/receive a signal by using a beam having a radiation pattern that is formed around a direction (e.g., the positive direction of the Z-axis) that a front surface of each of the plurality of patch antenna elements 741, 742, 743, and 744 faces.

According to an embodiment, the antenna module 700 may perform beamforming by using at least two or more antenna elements of the plurality of patch antenna elements 741, 742, 743, and 744. For example, the antenna module 700 may change a radiation direction and/or a shape of one beam formed by the plurality of patch antenna elements 741, 742, 743, and 744, by shifting phases associated with at least two or more antenna elements of the plurality of patch antenna elements 741, 742, 743, and 744.

In FIG. 7, the number of patch antenna elements 741, 742, 743, and 744 and a shape thereof are merely examples, and the embodiments of the disclosure are not limited thereto.

For example, the first AE group 740 may include two or more patch antenna elements, and each of the patch antenna elements may be formed in the shape of a square. For example, the first AE group 740 may be a (4×1) array antenna, but the first AE group 740 may be an array antenna having a different form (e.g., 2×2)

Figure 8:
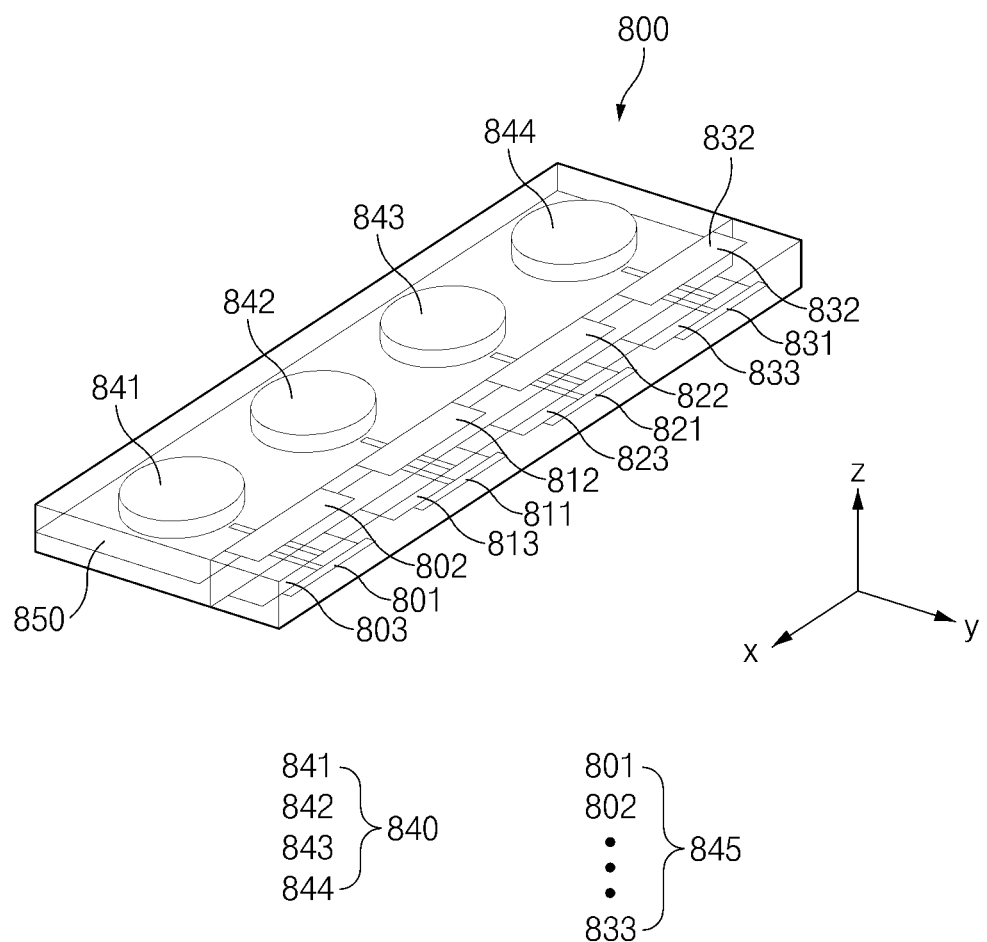
FIG. 8 is a perspective view of an antenna module according to an embodiment of the disclosure.

FIG. 8 is a perspective view of an antenna module according to an embodiment of the disclosure.

Referring to FIG. 8, according to an embodiment, an antenna module 800 may include a first AE group 840 (e.g., the first AE group 640 of FIG. 6) and a second AE group 845 disposed on a front surface of a PCB 850 (e.g., the PCB 650 of FIG. 6) (e.g., in a direction being parallel to the X-Y plane and facing the positive direction of the Z-axis). The antenna module 800 may include at least one communication circuit (not illustrated) (e.g., the communication circuit 630 of FIG. 6) disposed on a back surface of the PCB 750 (e.g., in a direction being parallel to the X-Y plane and facing the negative direction of the Z-axis). According to an embodiment, the first AE group 840 may include a plurality of patch antenna elements 841, 842, 843, and 844. A further description associated with the first AE group 840 may be referenced by the description associated with the first AE group 740 of FIG. 7, and thus, for convenience of description, additional description will be omitted to avoid redundancy.

According to an embodiment, the second AE group 845 may include a plurality of dipole antenna elements 801, 811, 821, and 831 and a plurality of shorted patch elements 802, 803, 812, 813, 822, 823, 832, and 833. For example, the plurality of dipole antenna elements 801, 811, 821, and 831 may transmit/receive a signal by using a beam corresponding to a radiation pattern generated toward one side surface of the antenna module 800 (e.g., around a positive direction of a Y-axis). In the case of the dipole antenna elements 801, 811, 821, and 831, a null point may be present in a longitudinal direction of the dipole antenna elements 801, 811, 821, and 831 (e.g., a direction of a long axis of a radiator of a dipole antenna). For example, the shorted patch elements 802, 803, 812, 813, 822, 823, 832, and 833 may include feeding conductive plates 802, 812, 822, and 832 and ground (GND) conductive plates 803, 813, 823, and 833 respectively corresponding to the feeding conductive plates 802, 812, 822, and 832. The shorted patch elements 802, 803, 812, 813, 822, 823, 832, and 833 may be used to supplement the beam coverage of the dipole antenna elements 801, 811, 821, and 831.

According to an embodiment, the antenna module 800 may perform beamforming by changing phases of a plurality of antenna elements belonging to the second AE group 845.

According to an embodiment, each of the antenna elements of the second AE group 845 may be connected with a transmission line through at least one feeding point. For example, each of the antenna elements of the second AE group 845 may be connected to a communication circuit through at least one transmission line formed at the interior of the PCB 850.

In FIG. 8, the number of antenna elements of the second AE group 845 and a shape thereof are merely examples, and the embodiments of the disclosure are not limited thereto. For example, the second AE group 845 may include two or more dipole antenna elements and may not include a shorted patch antenna element.

Figure 9A:
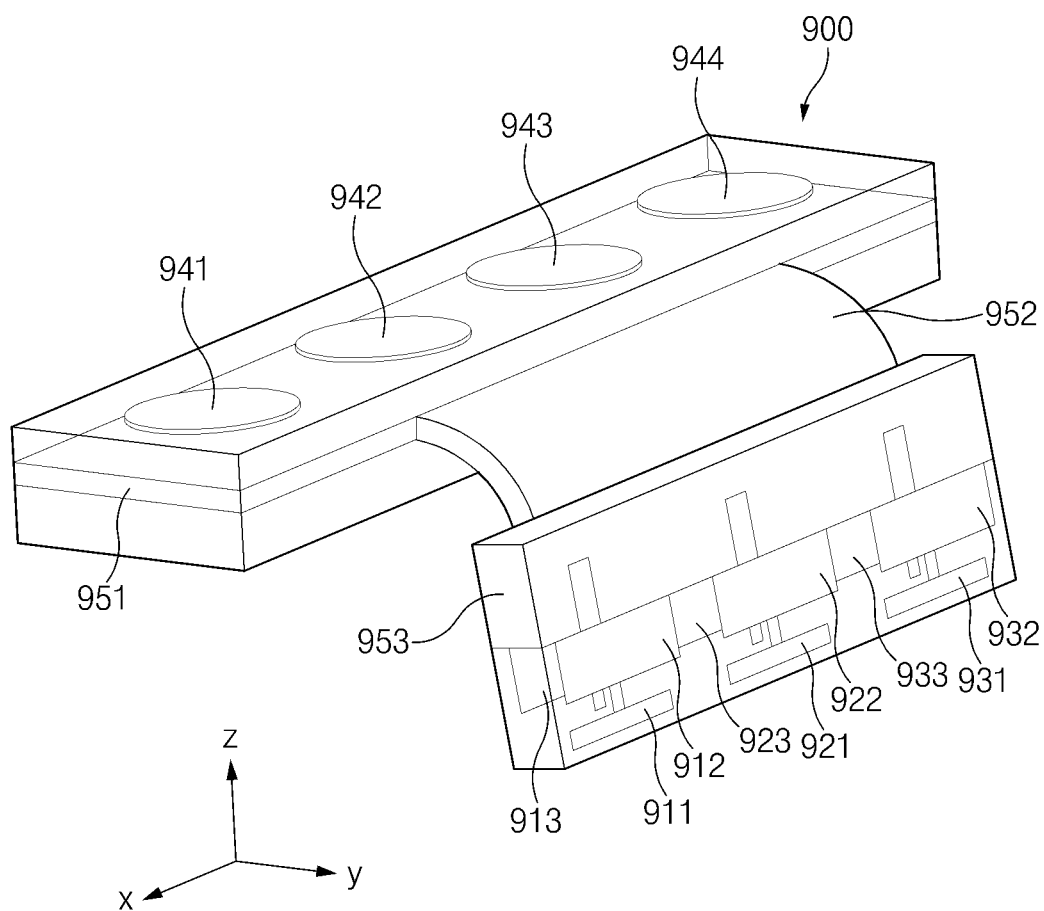
FIG. 9A is a perspective view of an antenna module according to an embodiment of the disclosure.
Figure 9A:
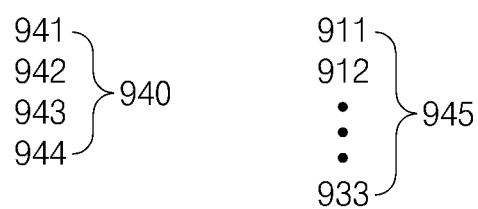

FIG. 9A is a perspective view of an antenna module according to an embodiment of the disclosure.

Referring to FIG. 9A, according to an embodiment, an antenna module 900 may include a first AE group 940 (e.g., the first AE group 640 of FIG. 6) disposed on a front surface of a first PCB 951 (e.g., in a direction being parallel to the X-Y plane and facing the positive direction of the Z-axis), and a second AE group 945 (e.g., the second AE group 645 of FIG. 6) disposed on a third PCB 953. For example, the first PCB 951 and the third PCB 953 may be electrically and/or physically connected through a connection member 952. For example, the connection member 952 may be a flexible material (e.g., an FPCB).

According to an embodiment, the antenna module 900 may include at least one communication circuit (not illustrated) (e.g., the communication circuit 630 of FIG. 6) disposed on a back surface of the first PCB 951 (e.g., in a direction being parallel to the X-Y plane and facing the negative direction of the Z-axis). According to an embodiment, the first AE group 940 may include a plurality of patch antenna elements 941, 942, 943, and 944. A further description associated with the first AE group 940 may be referenced by the description associated with the first AE group 740 of FIG. 7, and thus, for convenience of description, additional description will be omitted to avoid redundancy.

According to an embodiment, the second AE group 945 may include a plurality of dipole antenna elements 911, 921, and 931 and a plurality of shorted patch elements 912, 913, 922, 923, 932, and 933. Descriptions associated with the dipole antenna elements 911, 921, and 931 and the plurality of shorted patch elements 912, 913, 922, 923, 932, and 933 may be referenced by the descriptions associated with the second antenna element group 845 of FIG. 8.

According to an embodiment, when the antenna module 900 is mounted on an electronic device (e.g., the electronic device 200 of FIG. 2), the electronic device may cover a plurality of directions by using the first AE group 940 and the second AE group 945. For example, the electronic device may cover a direction facing a back surface of the electronic device (e.g., a direction perpendicular to the back plate 211 of FIG. 3) by using the first AE group 940 and may cover a direction between a front surface (e.g., the first surface 210A of FIG. 2) and a side surface (e.g., the side surface 210C of FIG. 2) of the electronic device by using the second AE group 945.

Figure 9B:
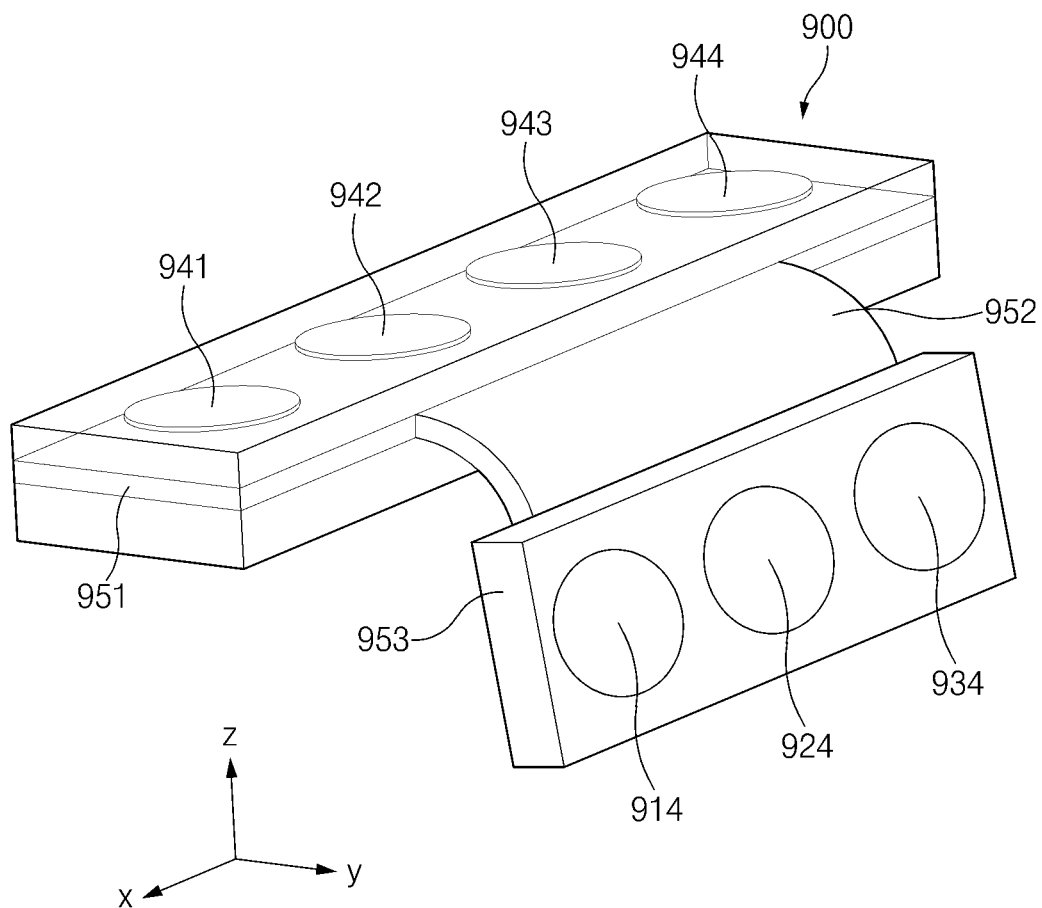
FIG. 9B is a perspective view of an antenna module according to an embodiment of the disclosure.

FIG. 9B is a perspective view of an antenna module according to an embodiment of the disclosure.

Referring to FIG. 9B, according to an embodiment, the antenna module 900 may include the first AE group 940 (e.g., the first AE group 640 of FIG. 6) disposed on the front surface of the first PCB 951 (e.g., in a direction being parallel to the X-Y plane and facing the positive direction of the Z-axis), and the second AE group 945 (e.g., the second AE group 645 of FIG. 6) disposed on the third PCB 953. For example, the first PCB 951 and the third PCB 953 may be electrically and/or physically connected through the connection member 952. For example, the connection member 952 may be a flexible material (e.g., an FPCB).

According to an embodiment, the antenna module 900 may include at least one communication circuit (not illustrated) (e.g., the communication circuit 630 of FIG. 6) disposed on the back surface of the first PCB 951 (e.g., in a direction being parallel to the X-Y plane and facing the negative direction of the Z-axis). According to an embodiment, the first AE group 940 may include a plurality of patch antenna elements 941, 942, 943, and 944. A further description associated with the first AE group 940 may be referenced by the description associated with the first AE group 740 of FIG. 7, and thus, for convenience of description, additional description will be omitted to avoid redundancy.

According to an embodiment, the second AE group 945 may include a plurality of patch antenna elements 914, 924, and 934. The patch antenna elements 914, 924, and 934 may transmit/receive a signal by using a beam corresponding to a radiation pattern generated toward one side surface of the antenna module 900 (e.g., around a direction perpendicular to a front surface of the third PCB 953).

According to an embodiment, when the antenna module 900 is mounted on an electronic device (e.g., the electronic device 200 of FIG. 2), the electronic device may cover a plurality of directions by using the first AE group 940 and the second AE group 945. For example, the electronic device may cover a direction facing the back surface of the electronic device (e.g., a direction perpendicular to the back plate 211 of FIG. 3) by using the first AE group 940 and may cover a direction between a front surface (e.g., the first surface 210A of FIG. 2) and a side surface (e.g., the side surface 210C of FIG. 2) of the electronic device by using the second AE group 945. For example, to secure the coverage of the electronic device, the third PCB 953 of the antenna module 900 may be mounted in the electronic device in a state of being tilted toward a display so as to face a direction between the front surface and the side surface of the electronic device. For another example, to secure the coverage of the electronic device, the third PCB 953 of the antenna module 900 may be mounted in the electronic device so as to face toward the side surface of the electronic device. For another example, the antenna module 900 may be mounted in the electronic device in a state of being tilted to face a direction between the back plate and the side surface of the electronic device.

Examples are illustrated in FIGS. 9A and 9B as the connecting member 952 and the third PCB 953 are separate PCBs, but the connecting member 952 and the third PCB 953 may be implemented with one FPCB. In this case, the dipole antenna elements 911, 921, and 931 may be formed of conductive patterns on the FPCB.

First Embodiment

Figure 10:
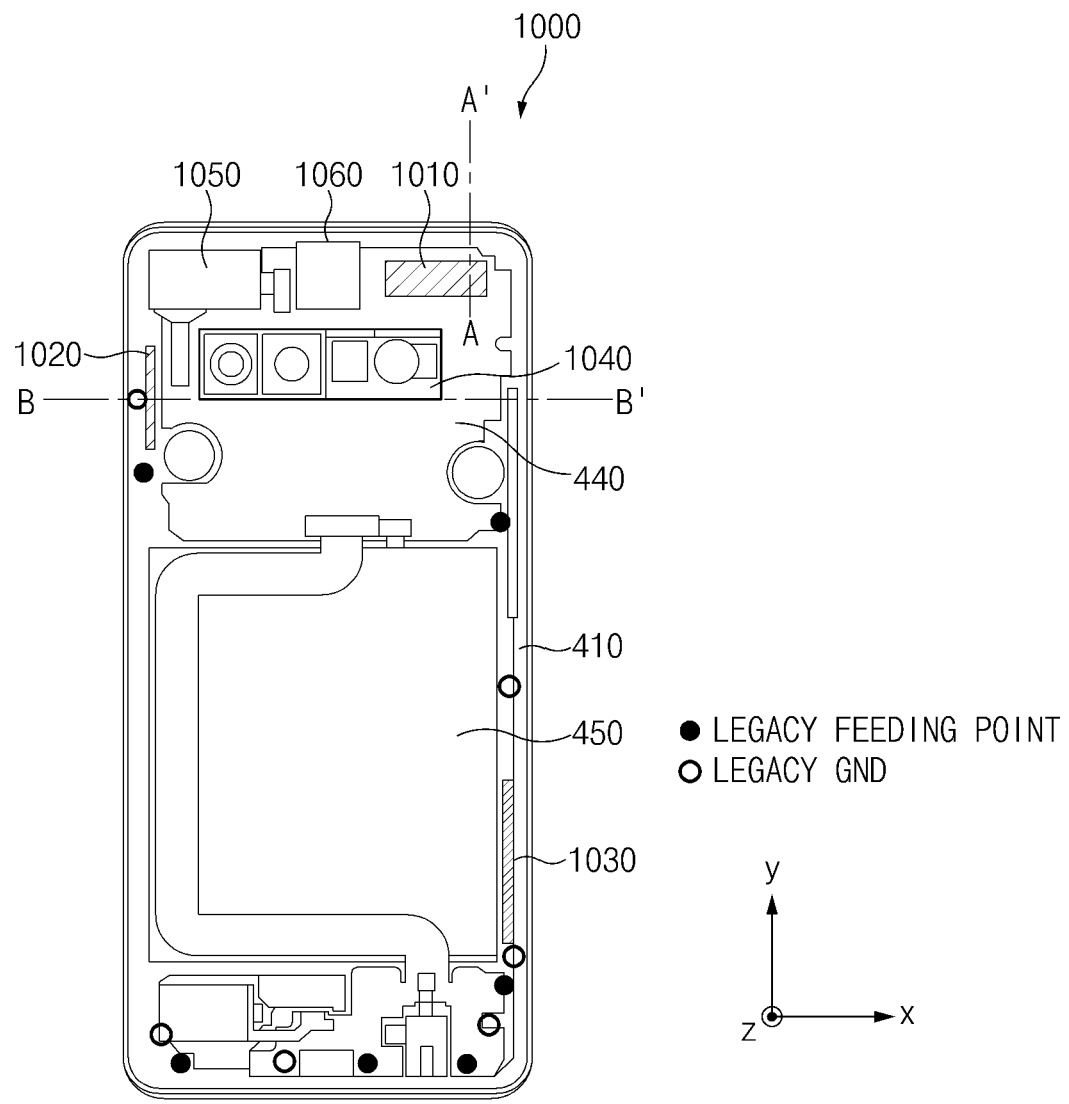
FIG. 10 is a view illustrating antenna modules disposed in an electronic device, according to an embodiment of the disclosure.

FIG. 10 is a view illustrating antenna modules disposed in an electronic device, according to an embodiment of the disclosure.

Referring to FIG. 10, according to an embodiment, an electronic device 1000 (e.g., the electronic device 101 of FIG. 1) may include a first antenna module 1010, a second antenna module 1020, and a third antenna module 1030. For example, FIG. 10 illustrates an inner appearance of the electronic device 1000 when viewing the electronic device 1000 from the back surface of the electronic device 1000. For example, FIG. 10 may illustrate the interior of the electronic device 1000 viewed from the back surface of the electronic device 1000 in one direction (e.g., the negative direction of the Z-axis), after removing a back plate (e.g., the back plate 480 of FIG. 4) and an antenna (e.g., the antenna 470 of FIG. 4) of the electronic device 1000. For another example, FIG. 10 may illustrate the interior of the electronic device 1000 viewed from the back surface of the electronic device 1000 in the one direction, after removing the back plate, the antenna, and a second support member (e.g., the second support member 460 of FIG. 4) of the electronic device 1000.

According to an embodiment, at least a portion of the side bezel structure 410 (e.g., a front metal) may be used as a radiator for transmitting/receiving a wireless signal (e.g., a wireless signal of 6 GHz or lower) of legacy cellular communication (e.g., 3G and 4G mobile communication). For example, the side bezel structure 410 may correspond to at least a portion of an antenna including a plurality of legacy feeding points and a plurality of legacy GNDs. According to an embodiment, the side bezel structure 410 may be physically connected with a first support member (e.g., the first support member 411 (e.g., a bracket) of FIG. 4) placed at the inside of the side bezel structure 410, and at least a portion of the side bezel structure 410 may be insulated from the first support member.

According to an embodiment, the first antenna module 1010 may be placed on the upper right of the back surface of the electronic device 1000 in FIG. 10. For example, the first antenna module 1010 may be disposed at a location where at least a portion of the first antenna module 1010 overlaps a speaker 1060 (e.g., the sound output device 155 of FIG. 1) and/or a sensor part/SIM socket 1050, when viewed from a side surface of the electronic device 1000 (e.g., a positive direction of an X-axis or a negative direction of the X-axis). For example, the first antenna module 1010 may be disposed at a location where the first antenna module 1010 does not overlap the speaker 1060 and/or the sensor part/SIM socket 1050, when viewed from the back surface of the electronic device 1000. For example, the sensor part/SIM socket 1050 may include various sensors (e.g., a proximity sensor and/or a front image sensor (e.g., a front camera)). For example, the sensor part/SIM socket 1050 may accommodate a user identification module and/or an external electronic medium. For example, the first antenna module 1010 may be placed above a camera and fingerprint recognition module 1040 so as to be adjacent to the side bezel structure 410. For example, the first antenna module 1010 may be placed between the printed circuit board 440 and the back plate of the electronic device 1000. For example, the first antenna module 1010 may be placed not to overlap electronic components (e.g., the camera and fingerprint recognition module 1040, the sensor part/SIM socket 1050, and the speaker 1060) of the electronic device 1000 on one plane (e.g., the X-Y plane).

According to various embodiments, the first antenna module 1010 may correspond to the antenna module 800 of FIG. 8.

According to an embodiment, the first antenna module 1010 may include a plurality of patch antenna elements (e.g., the first AE group 840 of FIG. 8) disposed to face the back surface of the electronic device 1000. The first antenna module 1010 may transmit/receive a wireless signal by using a beam having a radiation pattern that is generated around a direction (e.g., the positive direction of the Z-axis) from the back surface of the electronic device 1000 to the outside of the electronic device 1000 by using the plurality of patch antenna elements. For example, the electronic device 1000 may implement the coverage toward the back surface of the electronic device 1000 by using the plurality of patch antenna elements of the first antenna module 1010. For example, the first antenna module 1010 may generate a beam, which is radiated from the interior of the electronic device 1000 to the outside of the electronic device 1000, through a non-conductive back plate (e.g., the back plate 480 of FIG. 4) of the electronic device 1000.

According to an embodiment, the first antenna module 1010 may include a plurality of dipole antenna elements and a plurality of shorted patch antennas (e.g., the second AE group 845 of FIG. 8). The first antenna module 1010 may generate a beam having a radiation pattern around a direction (e.g., the positive direction of the Y-axis) from the interior of the electronic device 1000 to the outside above an upper side surface of the electronic device 1000 and a display direction (e.g., a direction between the positive Y-axis direction and the negative Z-axis direction on an Y-Z plane), by using the plurality of dipole antenna elements and the plurality of shorted patch antenna elements. For example, the electronic device 1000 may implement the coverage in front of an upper side surface of the electronic device 1000 by using the plurality of dipole antenna elements and the plurality of shorted patch antenna elements. For example, the first antenna module 1010 may generate a beam, which is radiated from the interior of the electronic device 1000 to the outside of the electronic device 1000, through the back plate of the electronic device 1000 and a non-conductive region of the side bezel structure 410.

According to an embodiment, the second antenna module 1020 may be placed on the upper left of the back surface of the electronic device 1000 in FIG. 10. For example, the second antenna module 1020 may be disposed at a location where at least a portion of the second antenna module 1020 overlaps the camera and fingerprint recognition module 1040, when viewed from a side surface of the electronic device 1000 (e.g., the positive direction of the X-axis or the negative direction of the X-axis). For example, the second antenna module 1020 may be placed on the left of the camera and fingerprint recognition module 1040 so as to be adjacent to the side bezel structure 410, when viewed from the back surface of the electronic device 1000. For example, the second antenna module 1020 may be disposed at the electronic device 1000 such that a PCB of the second antenna module 1020 is perpendicular to a front display or the back plate of the electronic device 1000.

According to various embodiments, the second antenna module 1020 may correspond to the antenna module 700 of FIG. 7. According to an embodiment, the second antenna module 1020 may include a plurality of patch antenna elements (e.g., the first AE group 740 of FIG. 7) disposed to face the left side surface of the electronic device 1000 (e.g., the negative direction of the X-axis), when viewing the electronic device 1000 from the back surface of the electronic device 1000. The second antenna module 1020 may transmit/receive a wireless signal by using a beam having a radiation pattern that is generated around a direction (e.g., the negative direction of the X-axis) from the interior of the electronic device 1000 to the outside on one side of the electronic device 1000, by using the plurality of patch antenna elements. For example, the electronic device 1000 may implement the coverage toward the left side surface of the electronic device 1000 by using the plurality of patch antenna elements of the second antenna module 1020. For example, the second antenna module 1020 may generate a beam, which is radiated from the interior of the electronic device 1000 to the outside of the electronic device 1000, through a non-conductive region of the side bezel structure 410 and a non-conductive back plate of the electronic device 1000.

According to an embodiment, the third antenna module 1030 may be placed on the lower right of the back surface of the electronic device 1000 in FIG. 10. For example, the third antenna module 1030 may be disposed at a location where at least a portion of the third antenna module 1030 overlaps the battery 450, when viewed from a side surface of the electronic device 1000 (e.g., the positive direction of the X-axis or the negative direction of the X-axis). For example, the third antenna module 1030 may be placed between the battery 450 and the side bezel structure 410, when viewed from the back surface of the electronic device 1000. For example, the third antenna module 1030 may be disposed within the electronic device 1000 such that a PCB of the third antenna module 1030 is perpendicular to the front display or the back plate of the electronic device 1000.

According to various embodiments, the third antenna module 1030 may correspond to the antenna module 700 of FIG. 7. According to an embodiment, the third antenna module 1030 may include a plurality of patch antenna elements (e.g., the first AE group 740 of FIG. 7) disposed to face the right side surface of the electronic device 1000 (e.g., the positive direction of the X-axis), when viewing the electronic device 1000 from the back surface of the electronic device 1000. The third antenna module 1030 may transmit/receive a wireless signal by using a beam having a radiation pattern that is generated around a direction (e.g., the positive direction of the X-axis) from the interior of the electronic device 1000 to the outside of the electronic device 1000 by using the plurality of patch antenna elements. For example, the electronic device 1000 may implement the coverage toward the right side surface of the electronic device 1000 by using the plurality of patch antenna elements of the third antenna module 1030. For example, the third antenna module 1030 may generate a beam, which is radiated from the interior of the electronic device 1000 to the outside of the electronic device 1000, through a non-conductive region of the side bezel structure 410 and/or a non-conductive back plate of the electronic device 1000.

According to an embodiment, the first antenna module 1010 and the second antenna module 1020 may be grounded through electrical connection with a ground region of the printed circuit board 440 that is placed adjacent to the first antenna module 1010 and the second antenna module 1020. According to an embodiment, the third antenna module 1030 may be grounded through electrical connection with the side bezel structure 410 adjacent to the third antenna module 1030. For example, because third antenna module 1030 is disposed on one side of the battery 450, the third antenna module 1030 thus disposed may be spatially spaced from the printed circuit board 440. In this case, the side bezel structure 410 may provide a ground for the third antenna module 1030 by forming legacy ground points at corresponding portions of the side bezel structure 410 above and below the third antenna module 1030. For example, a legacy GND may be placed adjacent to the third antenna module 1030 compared to a legacy feeding point.

In the embodiment of FIG. 10, because the second antenna module 1020 and the third antenna module 1030 are mounted to be perpendicular to a display plane of the electronic device 1000, the second antenna module 1020 and/or the third antenna module 1030 may not include dipole antenna elements for the purpose of reducing the thickness of the electronic device 1000. Because the first antenna module 1010 is mounted parallel to the display plane, the first antenna module 1010 may increase the coverage of the electronic device 1000 by using dipole antenna elements. Null points of the negative X-axis direction and the positive X-axis direction generated by the dipole antenna elements of the first antenna module 1010 may be covered by the second antenna module 1020 and the third antenna module 1030.

Figure 11:
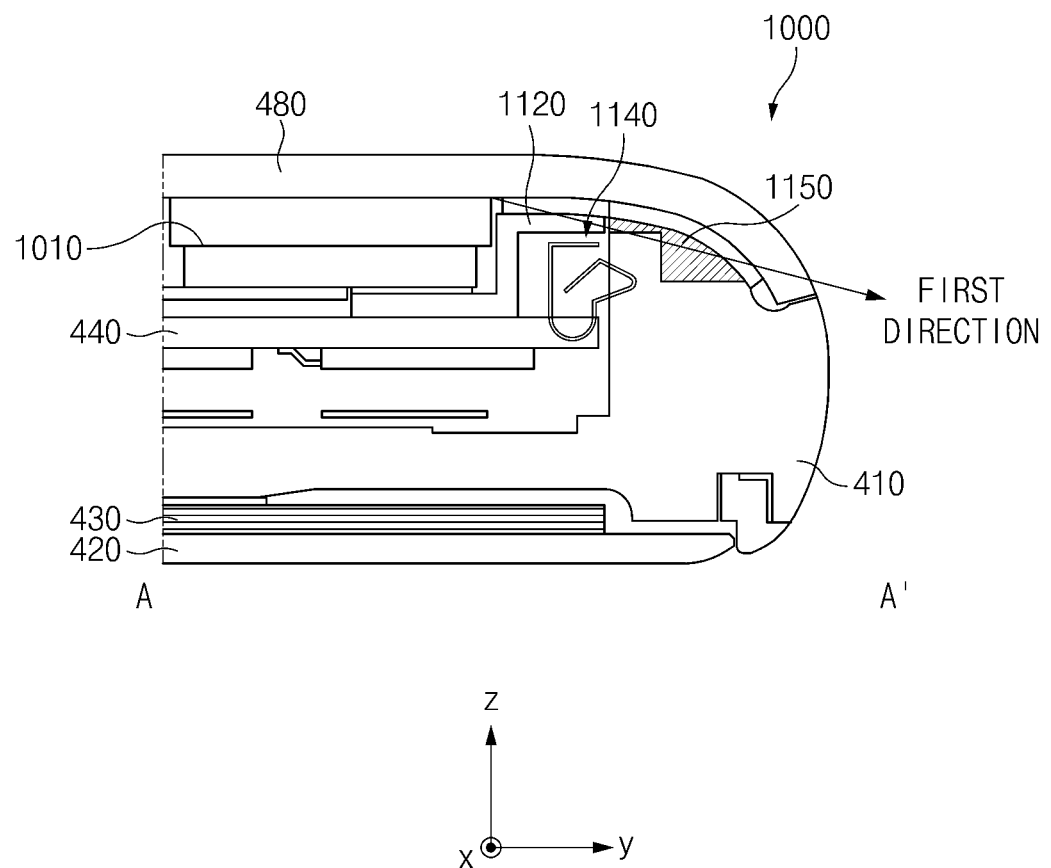
FIG. 11 is a cross-sectional view of an electronic device according to an embodiment of the disclosure.

FIG. 11 is a cross-sectional view of an electronic device according to an embodiment of the disclosure.

Referring to FIG. 11, the cross-sectional view may correspond to a cross-sectional view observed when a cross section of the electronic device 1000 taken along axis A-A' of FIG. 10 is viewed in a +X to −X direction. According to various embodiments, the first antenna module 1010 may be disposed substantially parallel to the front plate 420 and the display 430 and may be disposed to face the back plate 480.

According to an embodiment, a C clip 1140 may electrically connect the printed circuit board 440 and a conductive portion (e.g., a metallic portion) of the side bezel structure 410. For example, the side bezel structure 410 may be electrically connected with the ground region of the printed circuit board 440 through the C clip 1140. For another example, the side bezel structure 410 may be supplied with a power through the C clip 1140. At least a portion of the side bezel structure 410 may be electrically connected with the printed circuit board 440 to operate as a legacy antenna.

According to an embodiment, the C clip 1140 may connect the side bezel structure 410 to a legacy ground. For example, a legacy ground on axis A-A' of FIG. 10 may be formed by the C clip 1140. In the example of FIG. 11, according to an embodiment, the C clip 1140 may be placed between the first antenna module 1010 and the side bezel structure 410. For example, a contact between the C clip 1140 and the side bezel structure 410 may be placed to be lower than a beam direction (e.g., a first direction) of the first antenna module 1010 or at a lower point than the first antenna module 1010. The influence of the legacy ground of the C clip 1140 on the first antenna module 1010 may be minimized by setting a location of the contact between the C clip 1140 and the side bezel structure 410 to be relatively lower than the first antenna module 1010 (or to be placed below the first antenna module 1010).

For example, the C clip 1140 may be referred to as a "connection member" that electrically connects the printed circuit board 440 and the side bezel structure 410. The C clip 1140 is an example of a connection member, and embodiments of the disclosure are not limited thereto. For example, the C clip 1140 may be replaced with a connection member for electrically connecting the side bezel structure 410 and the printed circuit board 440, such as a screw contact, a double-sided adhesive tape (e.g., a conductive adhesive tape), an RF cable, an FPCB, or the like.

According to an embodiment, a component of the electronic device 1000 placed on a line of sight of the first antenna module 1010 may be formed of a non-conductive material. The first antenna module 1010 may be placed to radiate a signal through the back plate 480 and a non-conductive region 1150 of the side bezel structure 410. For example, the back plate 480 may be formed of a non-conductive material (e.g., polymer). For example, the non-conductive region 1150 may be placed at a portion of the side bezel structure 410, and the dipole antenna elements and the shorted antenna elements of the first antenna module 1010 may form a beam from the interior of the electronic device 1000 to the outside of the electronic device 1000 through the non-conductive region 1150 and the back plate 480. For example, the first direction may indicate the line of sight that is able to be generated by the dipole antenna elements and the shorted antenna elements of the first antenna module 1010.

According to an embodiment, the first antenna module 1010 may be placed between the printed circuit board 440 and the back plate 480, and an interposer 1120 may be placed between the first antenna module 1010 and the printed circuit board 440. For example, the interposer 1120 may be any structure (e.g., a PCB, a shield can, or a non-conductive structure) that allows the first antenna module 1010 to be disposed adjacent to the back plate 480. For example, in FIG. 11, the interposer 1120 may allow a location of the first antenna module 1010 to be higher than (e.g., with respect to the Z-axis) a conductive region (e.g., a metallic region) of the side bezel structure 410, and thus, the first antenna module 1010 may form a beam toward the display 430. For example, an interval may be formed between the first antenna module 1010 and the conductive region of the side bezel structure 410 by using the interposer 1120, when viewed from one side of the electronic device 1000 (e.g., the positive direction of the X-axis or the negative direction of the X-axis).

According to an embodiment, the non-conductive region 1150 of the side bezel structure 410 may be produced by a process at least including an injection-molding process. For example, the non-conductive region 1150 may be placed at the side bezel structure 410 through a double injection-molding process.

According to an embodiment, the non-conductive region 1150 of the side bezel structure 410 may not be viewable from the outside. For example, as the non-conductive region 1150 is covered by the back plate 480, the non-conductive region 1150 may not be exposed to the outside. For example, only at least a portion of a conductive region (e.g., a metallic portion) of the side bezel structure 410 may be exposed to the outside.

Figure 12:
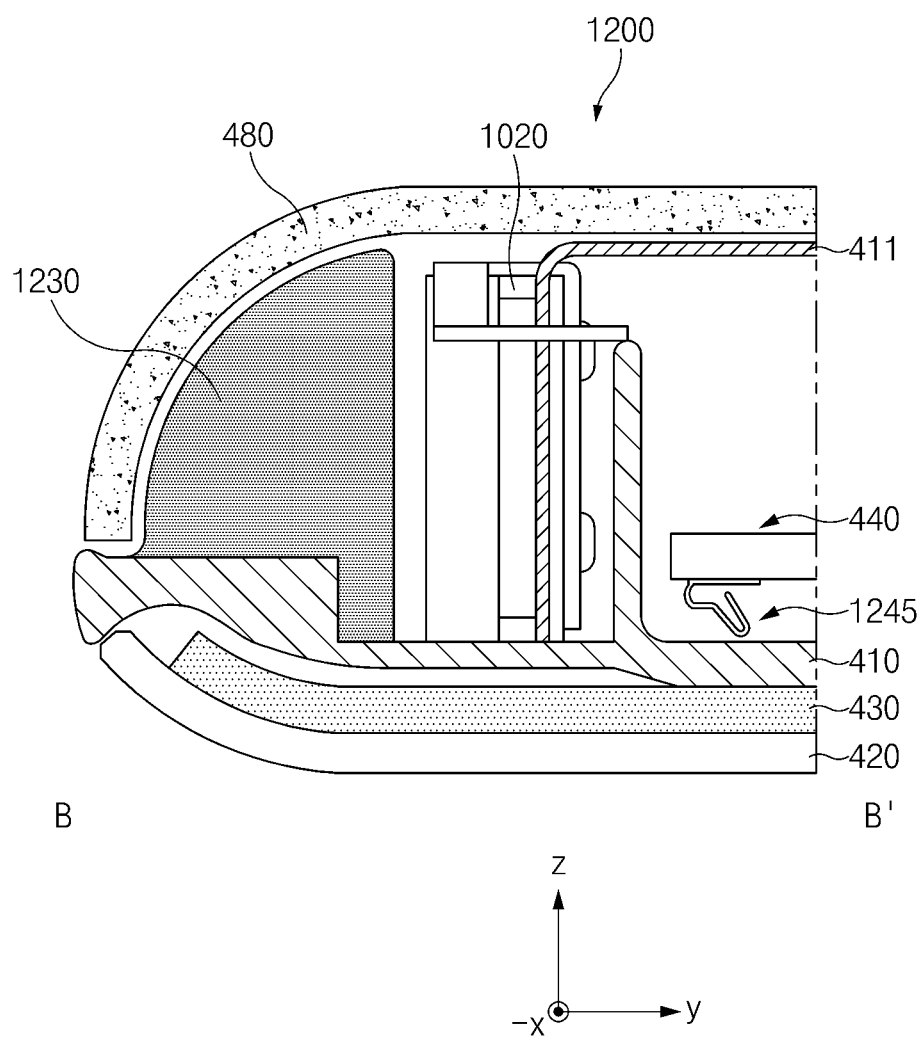
FIG. 12 is a cross-sectional view of an electronic device according to an embodiment of the disclosure.

FIG. 12 is a cross-sectional view of an electronic device according to an embodiment of the disclosure.

Referring to FIG. 12, the cross-sectional view may correspond to a cross-sectional view observed when a cross section of the electronic device 1000 taken along axis B-B' of FIG. 10 is viewed in a +Y to −Y direction. According to various embodiments, the second antenna module 1020 may be disposed substantially perpendicular to the front plate 420 and the display 430 and may be disposed to face a side surface of the electronic device 1000.

According to an embodiment, the second antenna module 1020 may be physically fixed by the first support member 411 (e.g., a bracket). The first support member 411 may be physically connected with the side bezel structure 410.

According to an embodiment, a component of the electronic device 1000 placed on a line of sight of the second antenna module 1020 may be formed of a non-conductive material. The second antenna module 1020 may be placed to radiate a signal through the back plate 480 being non-conductive and a non-conductive region 1230 of the side bezel structure 410. For example, the back plate 480 may be formed of a non-conductive material (e.g., polymer). For example, the non-conductive region 1230 may be placed at a portion of the side bezel structure 410, and the patch antenna elements of the second antenna module 1020 may form a beam from the interior of the electronic device 1000 to the outside of the electronic device 1000 through the non-conductive region 1230 and the back plate 480.

According to an embodiment, the non-conductive region 1230 of the side bezel structure 410 may be produced by a process at least including the injection-molding process. For example, the non-conductive region 1230 may be placed at the side bezel structure 410 through the double injection-molding process.

According to an embodiment, the non-conductive region 1230 of the side bezel structure 410 may not be viewable from the outside. For example, as the non-conductive region 1230 is covered by the back plate 480, the non-conductive region 1230 may not be exposed to the outside. For example, only a conductive region (e.g., a metallic portion) of the side bezel structure 410 may be exposed to the outside.

The mounting structure of the second antenna module 1020 described with reference to FIG. 12 may be similarly applied to the third antenna module 1030.

According to an embodiment, a C clip 1245 may electrically connect the printed circuit board 440 and a conductive portion (e.g., a metallic portion) of the side bezel structure 410. For example, the side bezel structure 410 may be electrically connected with the ground region of the printed circuit board 440 through the C clip 1245. For another example, the side bezel structure 410 may be supplied with a power through the C clip 1245. At least a portion of the side bezel structure 410 may be electrically connected with the printed circuit board 440 to operate as a legacy antenna.

According to an embodiment, the C clip 1245 may connect the side bezel structure 410 to a legacy ground. For example, a legacy ground on axis B-B' of FIG. 10 may be formed by the C clip 1245. In the example of FIG. 12, according to an embodiment, the C clip 1245 may be placed farther from the side bezel structure 410 than the second antenna module 1020 (e.g., to be closer to the inside of the electronic device 200 than the second antenna module 1020). For example, a contact between the C clip 1245 and the side bezel structure 410 may be placed in back of the second antenna module 1020 (e.g., a backward direction) such that the contact does not exist in the beam direction (e.g., the negative direction of the Y-axis) of the second antenna module 1020. The influence of the legacy ground of the C clip 1245 on the second antenna module 1020 may be minimized by setting a location of the contact between the C clip 1245 and the side bezel structure 410 to be in back of the second antenna module 1020.

For example, the C clip 1245 may be referred to as a "connection member" that electrically connects the printed circuit board 440 and the side bezel structure 410. The C clip 1245 is an example of a connection member, and embodiments of the disclosure are not limited thereto. For example, the C clip 1245 may be replaced with a connection member for electrically connecting the side bezel structure 410 and the printed circuit board 440, such as a screw contact, a double-sided adhesive tape (e.g., a conductive adhesive tape), an RF cable, an FPCB, or the like.

Second Embodiment

Figure 13:
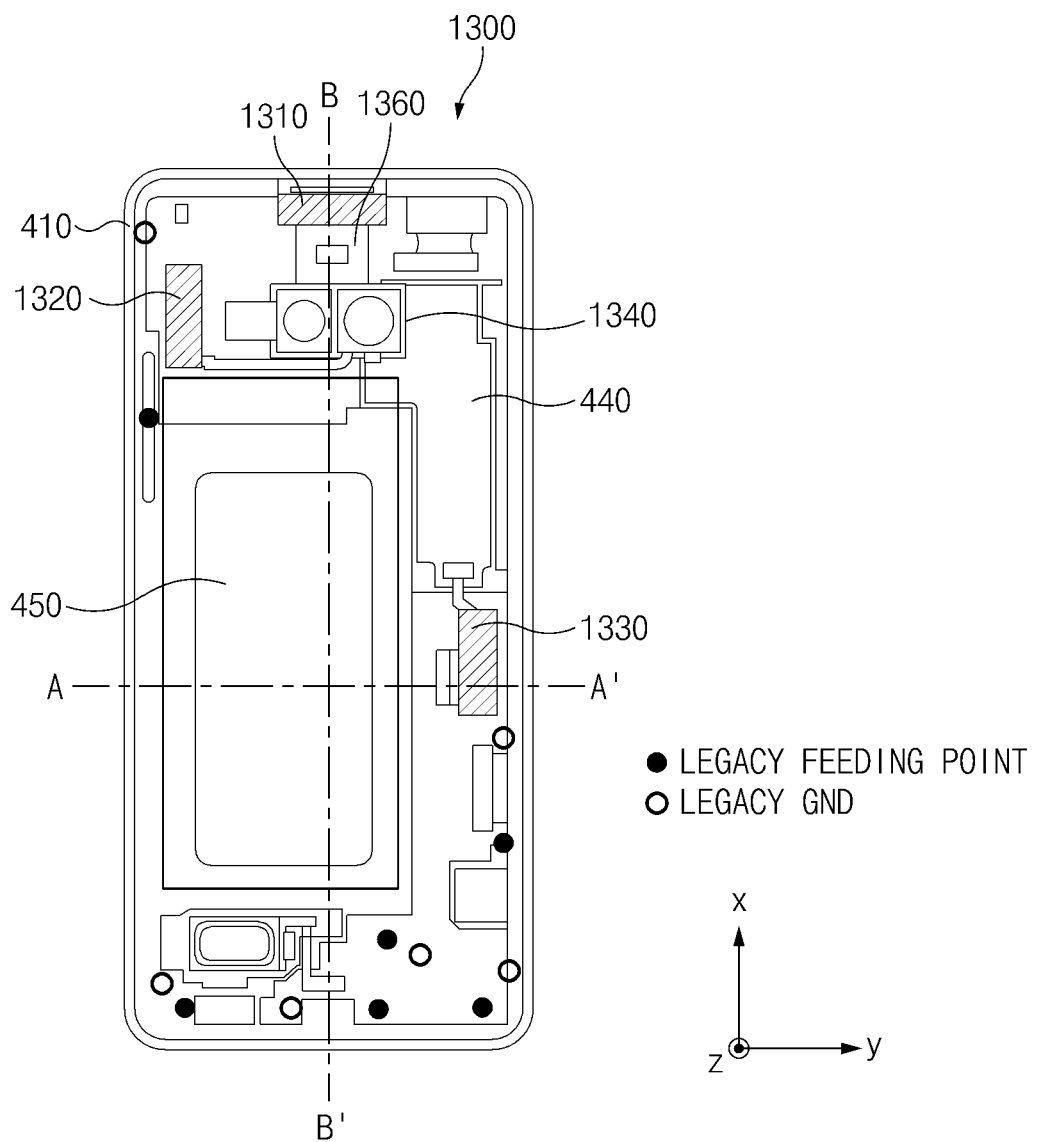
FIG. 13 is a view illustrating antenna modules disposed in an electronic device, according to an embodiment of the disclosure.

FIG. 13 is a view illustrating antenna modules disposed in an electronic device, according to an embodiment of the disclosure.

Referring to FIG. 13, according to an embodiment, an electronic device 1300 (e.g., the electronic device 101 of FIG. 1) may include a first antenna module 1310, a second antenna module 1320, and a third antenna module 1330. For example, FIG. 13 illustrates an inner appearance of the electronic device 1300 when viewing the electronic device 1300 from a back surface of the electronic device 1300. For example, FIG. 13 may illustrate the interior of the electronic device 1300 viewed from the back surface of the electronic device 1300 in one direction (e.g., the negative direction of the Z-axis), after removing a back plate (e.g., the back plate 480 of FIG. 4) and an antenna (e.g., the antenna 470 of FIG. 4) of the electronic device 1300. For another example, FIG. 13 may illustrate the interior of the electronic device 1300 viewed from the back surface of the electronic device 1300 in the one direction, after removing the back plate, the antenna, and a second support member (e.g., the second support member 460 of FIG. 4) of the electronic device 1300.

According to an embodiment, at least a portion of the side bezel structure 410 (e.g., a front metal) may be used as a radiator for transmitting/receiving a wireless signal (e.g., a wireless signal of 6 GHz or lower) of legacy cellular communication (e.g., 3G and 4G mobile communication). For example, the side bezel structure 410 may correspond to at least a portion of an antenna including a plurality of legacy feeding points and a plurality of legacy GNDs. According to an embodiment, the side bezel structure 410 may be physically connected with a first support member (e.g., the first support member 411 (e.g., a bracket) of FIG. 4) placed at the inside of the side bezel structure 410, and at least a portion of the side bezel structure 410 may be insulated from the first support member.

According to an embodiment, the first antenna module 1310 may be placed on the upper middle of the back surface of the electronic device 1300 in FIG. 13. For example, the first antenna module 1310 may be disposed above a speaker 1360. For example, the first antenna module 1310 may be disposed not to overlap the speaker 1360 (e.g., the sound output device 155 of FIG. 1), when viewed from a side surface of the electronic device 1300 (e.g., the positive direction of the X-axis or the negative direction of the X-axis). For example, the first antenna module 1310 may be placed between the printed circuit board 440 and the back plate of the electronic device 1300.

According to various embodiments, the first antenna module 1310 may correspond to the antenna module 800 of FIG. 8. A radiation pattern and a mounting structure of the first antenna module 1310 may be referenced by the description of the first antenna module 1010 given with reference to FIGS. 10 and 11, and thus, for convenience of description, additional description will be omitted to avoid redundancy.

According to various embodiments, the second antenna module 1320 may be placed on the upper left of the back surface of the electronic device 1300 in FIG. 13. For example, the second antenna module 1320 may be disposed at a location where at least a portion of the second antenna module 1320 overlaps a camera module 1340, when viewed from a side surface of the electronic device 1300 (e.g., the positive direction of the X-axis or the negative direction of the X-axis). For example, the second antenna module 1320 may be placed on the left of the camera module 1340 so as to be adjacent to the side bezel structure 410, when viewed from the back surface of the electronic device 1300. For example, the second antenna module 1320 may be disposed within the electronic device 1300 such that a PCB of the second antenna module 1320 is parallel to the front display or the back plate of the electronic device 1300.

According to various embodiments, the second antenna module 1320 may correspond to the antenna module 800 of FIG. 8. According to an embodiment, the second antenna module 1320 may include a plurality of patch antenna elements (e.g., the first AE group 840 of FIG. 8) disposed to face the back surface of the electronic device 1300 (e.g., the positive direction of the Z-axis), when viewing the electronic device 1300 from the back surface of the electronic device 1300. The second antenna module 1320 may transmit/receive a wireless signal by using a beam having a radiation pattern that is generated around a direction (e.g., the positive direction of the Z-axis) from the interior of the electronic device 1300 to the outside on one side of the electronic device 1300 by using the plurality of patch antenna elements.

According to an embodiment, the second antenna module 1320 may include a plurality of dipole antenna elements and a plurality of shorted patch antenna elements (e.g., the second AE group 845 of FIG. 8). The second antenna module 1320 may generate a beam having a radiation pattern around a direction (e.g., the negative direction of the X-axis) from the interior of the electronic device 1300 to the left of the electronic device 1300 and a display direction (e.g., a direction between the negative X-axis direction and the negative Z-axis direction on an X-Z plane) by using the plurality of dipole antenna elements and the plurality of shorted patch antennas. For example, the second antenna module 1320 may generate a beam, which is radiated from the interior of the electronic device 1300 to the outside of the electronic device 1300, through the back plate of the electronic device 1300 and a non-conductive region of the side bezel structure 410.

According to various embodiments, the third antenna module 1330 may be placed on the lower right of the back surface of the electronic device 1300 in FIG. 13. For example, the third antenna module 1330 may be disposed at a location where at least a portion of the third antenna module 1330 overlaps the battery 450, when viewed from a side surface of the electronic device 1300 (e.g., the positive direction of the X-axis or the negative direction of the X-axis). For example, the third antenna module 1330 may be placed between the battery 450 and the side bezel structure 410, when viewed from the back surface of the electronic device 1300. For example, the third antenna module 1330 may be disposed within the electronic device 1300 such that a PCB of the third antenna module 1330 is substantially parallel to the front display or the back plate of the electronic device 1300.

According to various embodiments, the third antenna module 1330 may correspond to the antenna module 800 of FIG. 8. According to an embodiment, the third antenna module 1330 may include a plurality of patch antenna elements (e.g., the first AE group 840 of FIG. 8) disposed to face the back surface of the electronic device 1300 (e.g., the positive direction of the Z-axis), when viewing the electronic device 1300 from the back surface of the electronic device 1300. The third antenna module 1330 may transmit/receive a wireless signal by using a beam having a radiation pattern that is generated around a direction (e.g., the positive direction of the Z-axis) from the interior of the electronic device 1300 to the outside on one side of the electronic device 1300 by using the plurality of patch antenna elements.

According to an embodiment, the third antenna module 1330 may include a plurality of dipole antenna elements and a plurality of shorted patch antenna elements (e.g., the second AE group 845 of FIG. 8). The third antenna module 1330 may generate a beam having a radiation pattern around a direction (e.g., the positive direction of the X-axis) from the interior of the electronic device 1300 to the right of the electronic device 1300 and a display direction (e.g., a direction between the positive X-axis direction and the negative Z-axis direction on the X-Z plane) by using the plurality of dipole antenna elements and the plurality of shorted patch antenna elements. For example, the third antenna module 1330 may generate a beam, which is radiated from the interior of the electronic device 1300 to the outside of the electronic device 1300, through the back plate of the electronic device 1300 and a non-conductive region of the side bezel structure 410.

In the embodiment of FIG. 13, the dipole antenna elements of the second antenna module 1320 and the third antenna module 1330 may be disposed to face a different direction from the dipole antenna elements of the first antenna module 1310. For example, an upper surface and a side surface of the electronic device 1300 may be covered by the dipole antenna elements, and a back surface of the electronic device 1300 may be covered by the patch antenna elements.

Figure 14:
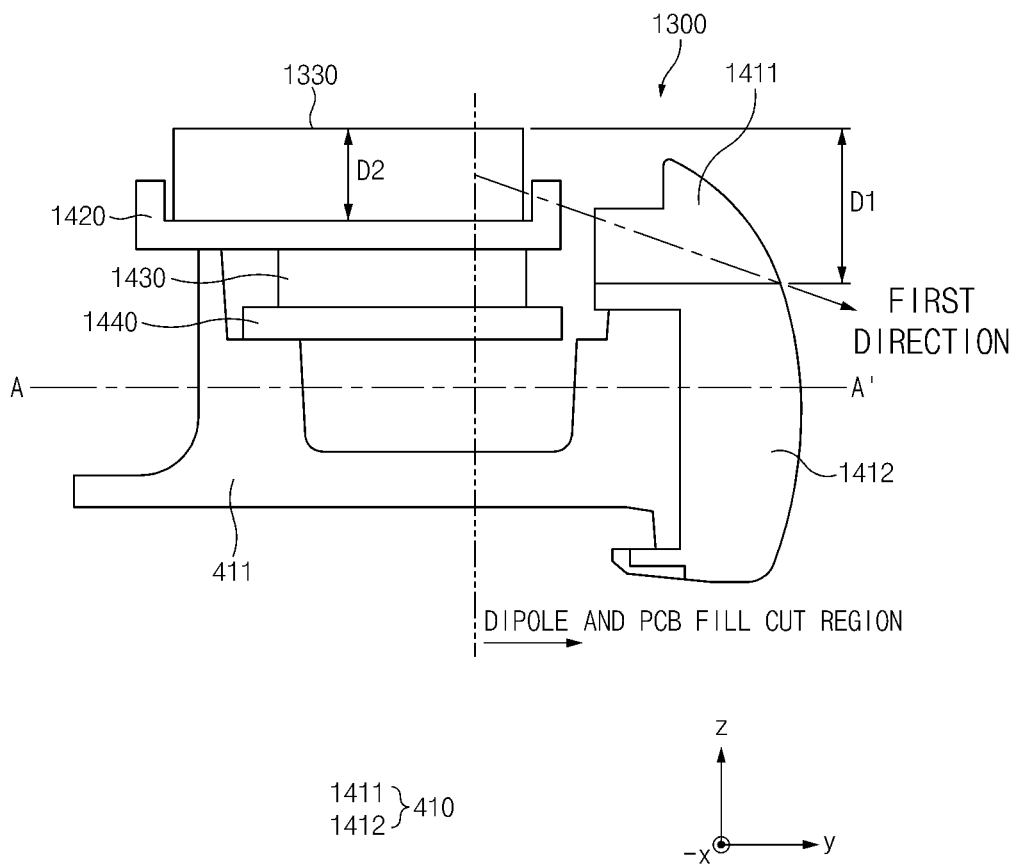
FIG. 14 is a cross-sectional view of an interior of an electronic device according to an embodiment of the disclosure.

FIG. 14 is a cross-sectional view of an interior of an electronic device according to an embodiment of the disclosure.

Referring to FIG. 14, the cross-sectional view may correspond to a cross-sectional view observed when a cross section of the electronic device 1300 taken along axis A-A' of FIG. 13 is viewed in a −Y to +Y direction. According to various embodiments, the third antenna module 1330 may be disposed adjacent to the back plate (not illustrated) so as to face the back plate and may be disposed substantially parallel to a display (not illustrated).

According to an embodiment, the third antenna module 1330 may include a shield can 1420. The third antenna module 1330 may be disposed on an interposer 1430 (e.g., a heat radiation structure) that is disposed on a PCB 1440. The interposer 1430 may be used to make a step (e.g., height difference) D1−D2 between the third antenna module 1330 and a conductive region 1412 of the side bezel structure 410.

According to an embodiment, a component of the electronic device 1300 placed on a line of sight of the third antenna module 1330 may be formed of a non-conductive material. The third antenna module 1330 may be placed to radiate a signal through the back plate and a non-conductive region 1411 of the side bezel structure 410. For example, a first direction may indicate the line of sight that is able to be generated by the dipole antenna elements and the shorted antenna elements of the third antenna module 1330.

According to an embodiment, the non-conductive region 1411 of the side bezel structure 410 may be produced by a process at least including the injection-molding process. For example, the non-conductive region 1411 may be placed on the conductive region 1412 of the side bezel structure 410 through the double injection-molding process.

According to an embodiment, the non-conductive region 1411 of the side bezel structure 410 may not be viewable from the outside. For example, as the non-conductive region 1411 is covered by the back plate, the non-conductive region 1411 may not be exposed to the outside.

The configuration of the third antenna module 1330 described with reference to FIG. 14 may be similarly applied to the second antenna module 1320.

Third Embodiment

Unless otherwise described, the description given with reference to the second embodiment above may be applied to the third embodiment.

Returning to FIG. 13, the first antenna module 1310 may correspond to the antenna module 900 of FIG. 9A or 9B. According to an embodiment, the first PCB 951 may include a plurality of patch antenna elements (e.g., the first AE group 940 of FIG. 9A or 9B) that is substantially parallel to a central portion of a display of the electronic device 1300. For example, the first PCB 951 may be disposed such that the plurality of patch antenna elements form a beam toward the back surface of the electronic device 1300.

According to an embodiment, the first antenna module 1310 may include a plurality of dipole antenna elements and a plurality of shorted patch antenna elements (e.g., the second AE group 945 of FIG. 9A or 9B). For example, a PCB (e.g., the third PCB 953 of FIG. 9A or 9B) where there are disposed the dipole antenna elements of the first antenna module 1310 may be disposed to be substantially perpendicular to the central portion of the display of the electronic device 1300. For example, the plurality of dipole antenna elements may be disposed to generate a beam through a non-display region of the front surface of the electronic device 1300. For example, the plurality of dipole antenna elements may generate a beam around the negative direction of the Z-axis.

In this embodiment, as the first antenna module 1310 has a bent shape, a movement of the speaker 1360 may be minimized. Also, the coverage for the front surface of the electronic device 1300 may be secured by using the dipole antenna elements of the first antenna module 1310.

According to an embodiment, the first antenna module 1310 may be implemented with only the third PCB 953 including the plurality of dipole antenna elements and the plurality of shorted patch antennas (e.g., the second AE group 945 of FIG. 9A or 9B). For example, the first antenna module 1310 may not include the first PCB 951 and the second PCB 952 of the antenna module 900 of FIG. 9A or 9B. In this case, a communication circuit may be disposed on a back surface of the third PCB 953. The movement of the speaker 1360 may be minimized by vertically disposing the first antenna module 1310 including only the dipole antenna elements on an upper portion of the electronic device 1300.

Fourth Embodiment

Unless otherwise described, the description given with reference to the second embodiment above may be applied to the fourth embodiment.

Returning to FIG. 13, the first antenna module 1310 may correspond to the antenna module 900 of FIG. 9A or 9B. According to an embodiment, unlike the example illustrated in FIG. 13, the first antenna module 1310 may be disposed to overlap the speaker 1360 on the X-Y plane.

Figure 15:
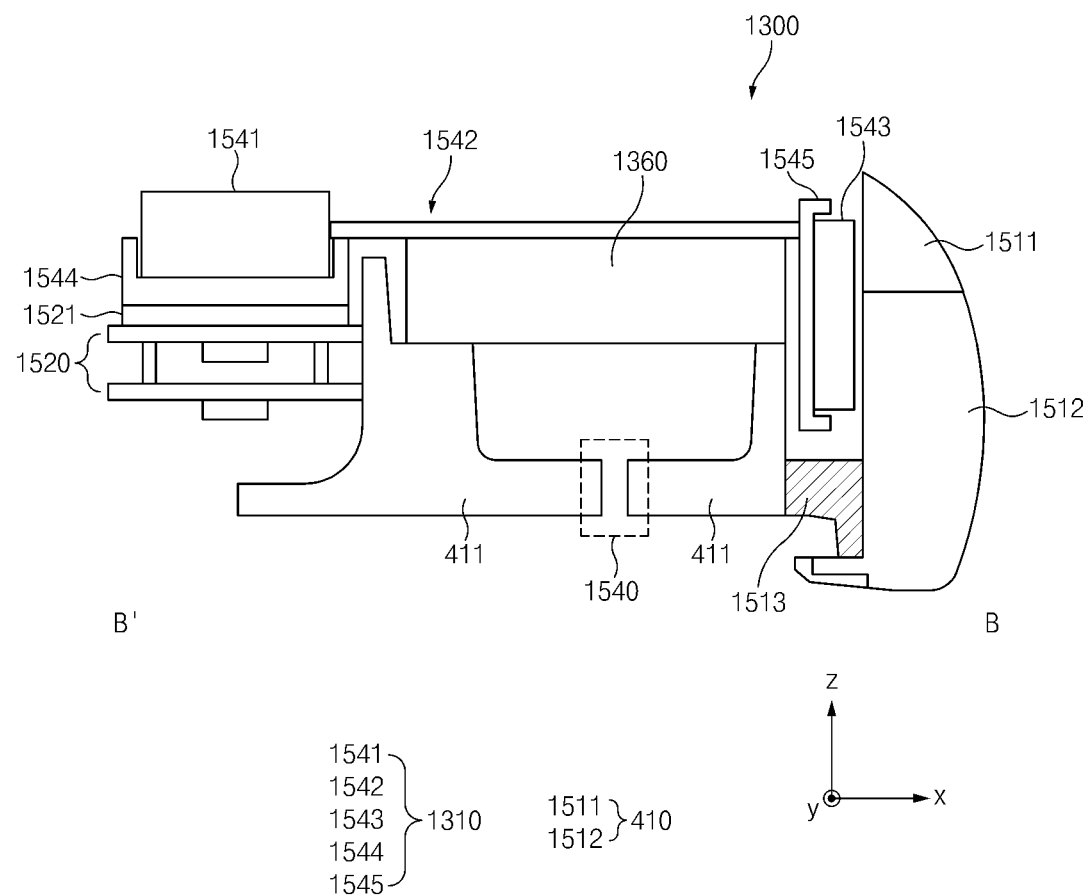
FIG. 15 is a cross-sectional view of an interior of an electronic device according to an embodiment of the disclosure.

FIG. 15 is a cross-sectional view of an interior of an electronic device according to an embodiment of the disclosure.

Referring to FIG. 15, the cross-sectional view may correspond to a cross-sectional view observed when a cross section of the electronic device 1300 taken along axis B-B' of FIG. 13 is viewed in a +X to −X direction. According to various embodiments, the first antenna module 1310 may include a first PCB 1541 (e.g., the first PCB 951 of FIG. 9A or 9B), a second PCB 1542 (e.g., the second PCB 952 of FIG. 9A or 9B), a third PCB 1543 (e.g., the third PCB 953 of FIG. 9A or 9B), a first shield can 1544, and a second shield can 1545.

For example, the first PCB 1541 may be disposed adjacent to the back plate (not illustrated) so as to face the back plate and may be disposed substantially parallel to the display (not illustrated). The first PCB 1541 may include a plurality of patch antenna elements (e.g., the first AE group 940 of FIG. 9A or 9B) disposed to face the back surface of the electronic device 1300. The first PCB 1541 may be disposed on an interposer 1520. For example, a heat radiation member 1521 may be placed between the interposer 1520 and the first shield can 1544.

For example, the second PCB 1542 may be an FPCB. The second PCB 1542 may electrically and/or physically connect the first PCB 1541 and the third PCB 1543 over a back surface of the speaker 1360.

For example, the third PCB 1543 may include a plurality of dipole antenna elements. The third PCB 1543 may be disposed adjacent to the side bezel structure 410 and may be disposed to be substantially perpendicular to the display of the electronic device 1300. For example, the plurality of dipole antenna elements of the third PCB 1543 may form a beam through a non-conductive region 1512 of the side bezel structure 410. The side bezel structure 410 may include a conductive region 1511 on a side of the back plate of the electronic device 1300 and may include the non-conductive region 1512 on a side of the display. For example, the plurality of dipole antenna elements of the third PCB 1543 may form a beam toward the front surface of the electronic device 1300 through the non-conductive region 1512 formed at the first support member 411.

In this embodiment, the speaker 1360 may output sound to the outside of the electronic device 1300 through a through hole 1540 of the first support member 411 and a receiver hole (e.g., the receiver hole 214 of FIG. 2) placed on the front surface of the electronic device 1300. For example, even though a location of the speaker 1360 is changed due to the third PCB 1543 thus mounted, a location of the through hole 1540 may be maintained. That is, an internal location of the speaker 1360 may be changed without a change of the outer appearance of the electronic device 1300 by maintaining the locations of the through hole 1540 and the receiver hole. For example, the speaker 1360 may be an enclosure speaker.

Fifth Embodiment

Figure 16:
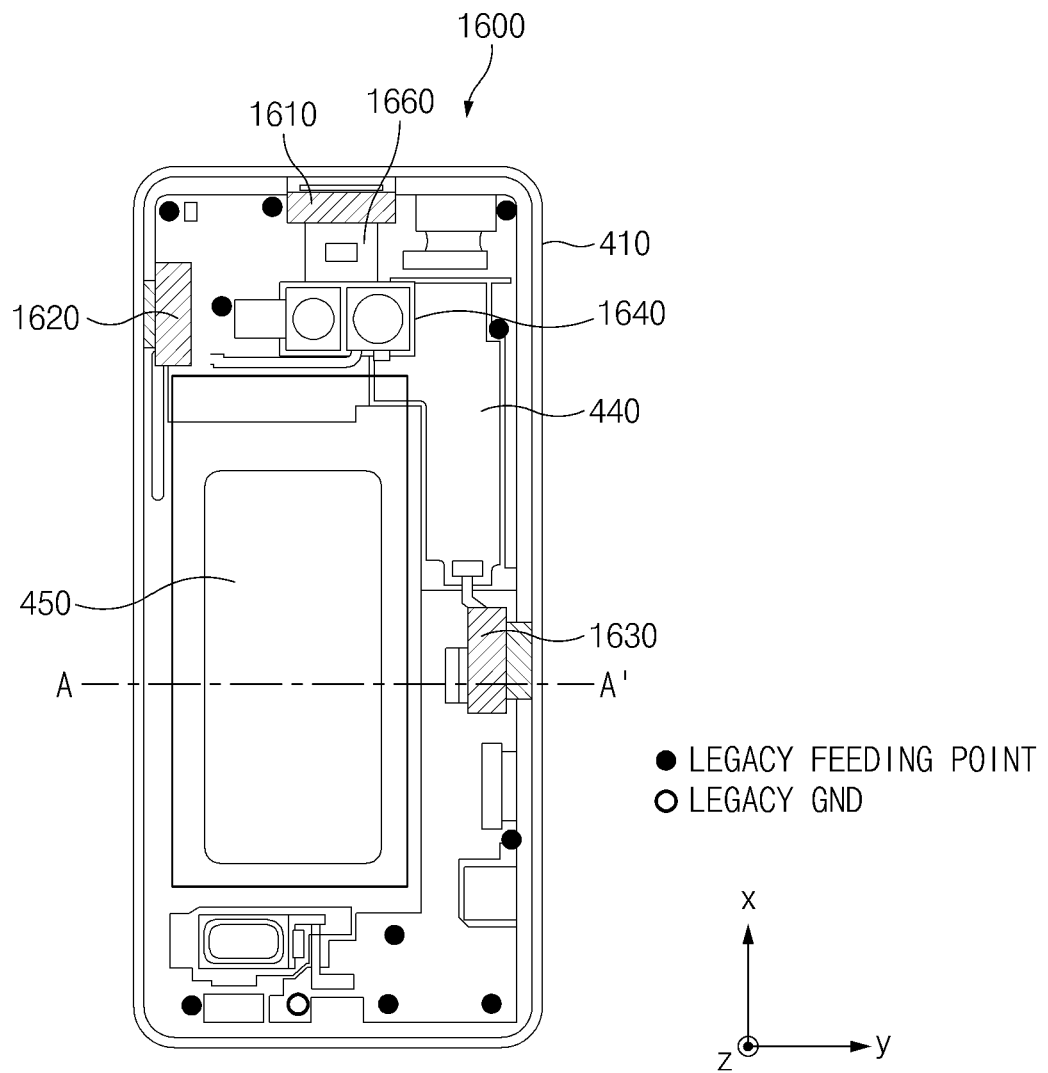
FIG. 16 is a view illustrating antenna modules disposed in an electronic device, according to an embodiment of the disclosure.

FIG. 16 is a view illustrating antenna modules disposed in an electronic device, according to an embodiment of the disclosure.

Referring to FIG. 16, according to an embodiment, an electronic device 1600 (e.g., the electronic device 101 of FIG. 1) may include a first antenna module 1610, a second antenna module 1620, and a third antenna module 1630. For example, FIG. 16 illustrates an inner appearance of the electronic device 1600 when viewing the electronic device 1600 from a back surface of the electronic device 1600. For example, FIG. 16 may illustrate the interior of the electronic device 1600 viewed from the back surface of the electronic device 1600 in one direction (e.g., the negative direction of the Z-axis), after removing a back plate (e.g., the back plate 480 of FIG. 4) and an antenna (e.g., the antenna 470 of FIG. 4) of the electronic device 1600. For another example, FIG. 16 may illustrate the interior of the electronic device 1600 viewed from the back surface of the electronic device 1600 in the one direction, after removing the back plate, the antenna, and a second support member (e.g., the second support member 460 of FIG. 4) of the electronic device 1600. Unless otherwise described, a structure of the electronic device 1600 may be referenced by the description associated with the structure of the electronic device 1300 of FIG. 13. In this embodiment, the first antenna module 1610 may be an antenna module identical to the first antenna module 1310 of the third embodiment or the fourth embodiment.

According to various embodiments, the second antenna module 1620 may be placed on the upper left of the back surface of the electronic device 1600 in FIG. 16. For example, the second antenna module 1620 may be disposed at a location where at least a portion of the second antenna module 1620 overlaps a camera module 1640, when viewed from a side surface of the electronic device 1600 (e.g., the positive direction of the X-axis or the negative direction of the X-axis). For example, the second antenna module 1620 may be placed on the left of the camera module 1640 so as to be adjacent to the side bezel structure 410, when viewed from the back surface of the electronic device 1600.

According to various embodiments, each of the second antenna module 1620 and the third antenna module 1630 may correspond to the antenna module 900 of FIG. 9A or 9B. According to an embodiment, each of the second antenna module 1620 and the third antenna module 1630 may include a first PCB (e.g., the first PCB 951 of FIG. 9A or 9B) including a plurality of patch antenna elements (e.g., the first AE group 940 of FIG. 9A or 9B), and a third PCB (e.g., the third PCB 953 of FIG. 9A or 9B) including a plurality of dipole antenna elements and a plurality of shorted patch antenna elements. According to an embodiment, the first PCB and the third PCB may be electrically and physically connected through a second PCB (e.g., the second PCB 952 of FIG. 9A or 9B) having flexibility. According to an embodiment, the first PCB and the third PCB may be directly connected, and the second PCB may be implemented with a PCB having flexibility.

According to an embodiment, in each of the second antenna module 1620 and the third antenna module 1630, the first PCB may be disposed to face toward the back surface (e.g., the positive direction of the Z-axis) of the electronic device 1600, and the third PCB may be disposed at a region corresponding to a curved portion (e.g., the second region 210E of FIG. 3) between the back plate and the side bezel structure 410 of the electronic device 1600. For example, as the third PCB is mounted within the electronic device 1600 in the shape of being bent from the first PCB so as to correspond to the curved portion, a beam generated by the dipole antenna elements of the third PCB may well face a front direction (e.g., the negative direction of the Z-axis) of the electronic device 1600.

Figure 17:
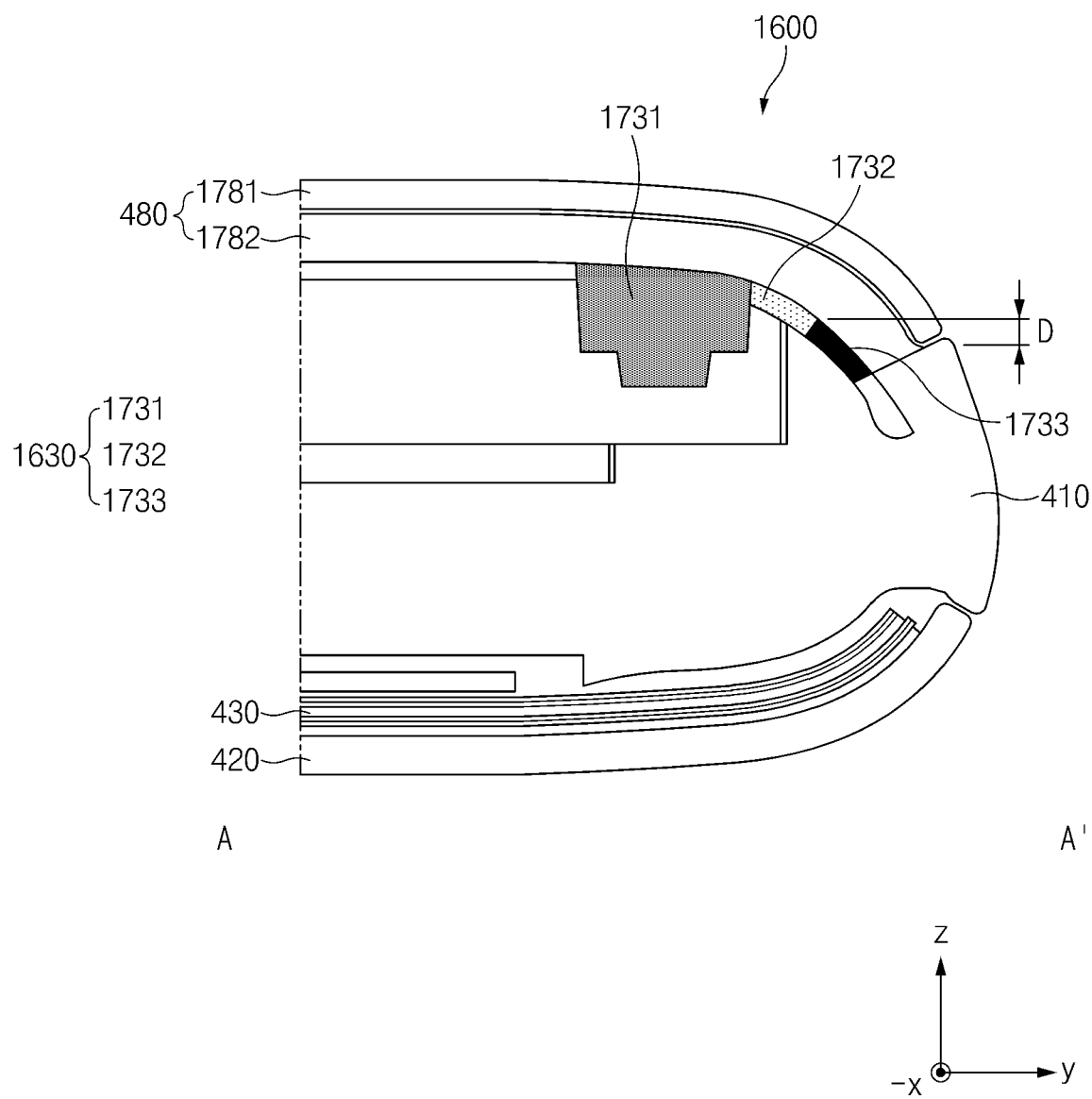
FIG. 17 is a cross-sectional view of an electronic device according to an embodiment of the disclosure.

FIG. 17 is a cross-sectional view of an electronic device according to an embodiment of the disclosure.

Referring to FIG. 17, the cross-sectional view may correspond to a cross-sectional view observed when a cross section of the electronic device 1600 taken along axis A-A' of FIG. 16 is viewed in a −Y to +Y direction. According to various embodiments, a patch antenna element part 1731 (e.g., a first PCB) of the third antenna module 1630 may be disposed adjacent to the back plate 480 so as to face the back plate 480 and may be disposed substantially parallel to the display 430. For example, the back plate 480 may include a back glass 1781 and a non-conductive layer 1782. A dipole and shorted patch antenna element part 1732 of the third antenna module 1630 may be disposed adjacent to the back plate 480 and may be extended from the patch antenna element part 1731 along a curved surface of the back plate 480 in a direction facing the side bezel structure 410. Unless otherwise described, a structure of the third antenna module 1630 may be similar to the structure of the third antenna module 1330.

According to an embodiment, the third antenna module 1630 may further include a PCB fill cut region 1733. For example, the PCB fill cut region 1733 may be extended toward the side bezel structure 410 from one end of the dipole and shorted patch antenna element part 1732 and may be bent along the curved portion of the back plate 480 when mounted. For example, the PCB fill cut region 1733 may indicate one region of a PCB, which does not include a wire structure. The PCB fill cut region 1733 may be used to physically fix the third antenna module 1630 to the back plate 480.

According to an embodiment, a step "D" may be present between an antenna surface of the third antenna module 1630 and a conductive region of the side bezel structure 410. For example, like the step D1-D2 described with reference to FIG. 14, by setting a height of the conductive region of the side bezel structure 410 to be relatively lower than a height of the antenna surface of the third antenna module 1630, a beam by the third antenna module 1630 may be further generated toward the front surface of the electronic device 1600. As described with reference to FIG. 14, a structure such as an interposer may be used.

Table 1 below illustrates a −90 degree gain for the dipole and shorted patch antenna element part 1732 according to the step "D" and a gain at the PCB fill cut region 1733.

TABLE 1

| D (mm) | −90 degree gain (dBi) | Fill cut region gain (dBi) | Note |
|---|---|---|---|
| −1 | −2.4 | −1.4 | |
| 1 | 4.4 | 5 | |
| 3 | 6.7 | 7 | |
| 7 | 6.9 | 7.2 | |
| N/A | 8.5 | 8.5 | side bezel structure 410 being formed of non-conductive material |

As illustrated in FIG. 17, because the non-conductive layer 1782 is covered by the back glass 1781 from the outside, an injection-molding band of the non-conductive layer 1782 is not viewable at the outer appearance of the electronic device 1600.

The configuration of the third antenna module 1630 described with reference to FIG. 17 may be similarly applied to the second antenna module 1620.

According to various embodiments, an electronic device (e.g., the electronic device 400 of FIG. 4) may include a display (e.g., the display 430 of FIG. 4) disposed on a front surface of the electronic device and a front plate (e.g., the front plate 420 of FIG. 4) disposed on the display, a back plate (e.g., the back plate 480 of FIG. 4) that is disposed on a back surface of the electronic device, a side member (e.g., the bezel structure 410 of FIG. 4) that is placed between the front plate and the back plate and forms an outer appearance of the electronic device together with the front plate and the back plate, and at least one antenna module (e.g., the antenna module 600 of FIG. 6) that includes a plurality of conductive plates (e.g., the first AE group 640 and/or the second AE group 645 of FIG. 6) configured to transmit/receive a signal in a specified first frequency band and is disposed between the front plate and the back plate so as to be adjacent to the side member. For example, at least some of the plurality of conductive plates may be disposed at the at least one antenna module so as to transmit/receive a wireless signal through the back plate. For example, at least some of the plurality of conductive plates may be disposed at the at least one antenna module so as to transmit/receive a wireless signal through a non-conductive region (e.g., the non-conductive region 1150 of FIG. 11, the non-conductive region 1230 of FIG. 12, the non-conductive region 1411 of FIG. 14, or the non-conductive region 1512 of FIG. 15) of the side member. For example, the side member may include a conductive region, of which at least a portion is capable of being used as an antenna of a signal in a specified second frequency band different from the specified first frequency band, and the non-conductive region, and the non-conductive region may be covered by the back plate and may not be viewable from the outside of the electronic device.

According to an embodiment, the at least one antenna module may include a first antenna module (e.g., the first antenna module 1010 of FIG. 10, the first antenna module 1310 of FIG. 13, or the first antenna module 1610 of FIG. 16). The first antenna module may be placed on an upper middle of the electronic device so as to be adjacent to a speaker (e.g., the speaker 1060 of FIG. 10, the speaker 1360 of FIG. 13, or a speaker 1660 of FIG. 16), and the speaker may output a sound through a receiver hole (e.g., the receiver hole 1540 of FIG. 15) formed on the front plate of the electronic device.

According to an embodiment, the first antenna module (e.g., the first antenna module 1310 of FIG. 13 or the first antenna module 1610 of FIG. 16) may include a printed circuit board (PCB) that is placed between the speaker and the side member and above the speaker when viewed from the back surface of the electronic device and a printed circuit board (PCB) including a plurality of patch-type conductive plates and a plurality of dipole-type conductive plates, the plurality of patch-type conductive plates may be disposed to form a beam toward the back plate, and the plurality of dipole-type conductive plates may be disposed above the plurality of patch-type conductive plates so as to be closer to the side member than the plurality of patch-type conductive plates.

According to an embodiment, a location of the plurality of dipole-type conductive plates may be placed to be higher than the conductive region of the side member, when viewing the electronic device from a back surface, such that at least a portion of a beam pattern by the plurality of dipole-type conductive plates is formed toward the front surface of the electronic device.

According to an embodiment, the first antenna module may be placed between an interposer (e.g., the interposer 1520 of FIG. 15) disposed on a support member within the electronic device and the back plate, such that a location of the plurality of dipole-type conductive plates of the first antenna module is higher than the conductive region of the side member.

According to an embodiment, the first antenna module (e.g., the antenna module 900 of FIG. 9A or 9B) may be placed between the speaker and the side member and above the speaker when viewed from the back surface of the electronic device. The first antenna module may include a first PCB (e.g., the first PCB 951 of FIG. 9A or 9B) where a plurality of patch-type conductive plates are disposed and a second PCB (e.g., the third PCB 953 of FIG. 9A or 9B) where a plurality of dipole-type conductive plates are disposed. The first PCB may be placed within the electronic device such that one surface of the first PCB where the plurality of patch-type conductive plates (e.g., the first AE group 940 of FIG. 9A or 9B) are disposed is substantially parallel to the back plate, and the second PCB may be extended from one end of the one surface of the first PCB toward the side member and may include a curved portion (e.g., the connection member 952 of FIG. 9A or 9B), of which at least a portion has a shape of being bent from the one surface of the first PCB toward the front surface of the electronic device. For example, the curved portion may be a flexible printed circuit board (FPCB) physically and electrically connecting the first PCB and the second PCB.

According to an embodiment, the at least one antenna module may include a second antenna module (e.g., the second antenna module 1020 of FIG. 10, the second antenna module 1320 of FIG. 13, or the second antenna module 1620 of FIG. 16) and a third antenna module (e.g., the third antenna module 1030 of FIG. 10, the third antenna module 1330 of FIG. 13, or the third antenna module 1630 of FIG. 16). The second antenna module may be placed on an upper left of the electronic device so as to be adjacent to the side member when viewing the electronic device from the back surface of the electronic device. The third antenna module may be placed on a right side of the electronic device and between a battery of the electronic device and the side member when viewing the electronic device from the back surface of the electronic device.

For example, each of the second antenna module and the third antenna module may include at least one printed circuit board (PCB) where a plurality of patch-type conductive plates and a plurality of dipole-type conductive plates are disposed, the plurality of patch-type conductive plates may be disposed to form a beam toward the back plate, and the plurality of dipole-type conductive plates may be disposed above the plurality of patch-type conductive plates so as to closer to the side member than the plurality of patch-type conductive plates.

For example, each of the second antenna module and the third antenna module may include a first PCB where the plurality of patch-type conductive plates are disposed and a second PCB where the plurality of dipole-type conductive plates are disposed, the first PCB may be placed within the electronic device such that one surface of the first PCB where the plurality of patch-type conductive plates are disposed is substantially parallel to the back plate, the second PCB may be extended from one end of the one surface of the first PCB toward the side member and may include a curved portion, of which at least a portion has a shape of being bent from the one surface of the first PCB toward the front surface of the electronic device, a fill cut region extended from a region, in which the plurality of dipole-type conductive plates are disposed, toward the side member, and the fill cut region may be formed of a non-conductive material.

According to various embodiments, an electronic device (e.g., the electronic device 400 of FIG. 4) may include a display (e.g., the display 430 of FIG. 4) disposed on a front surface of the electronic device and a front plate (e.g., the front plate 420 of FIG. 4) disposed on the display, a back plate (e.g., the back plate 480 of FIG. 4) that is disposed on a back surface of the electronic device, a side member (e.g., the bezel structure 410 of FIG. 4) that is placed between the front plate and the back plate and forms an outer appearance of the electronic device together with the front plate and the back plate, a first antenna module (e.g., the first antenna module1010 of FIG. 10, the first antenna module 1310 of FIG. 13 or the first antenna module 1610 of FIG. 16) that includes a plurality of conductive plates configured to transmit/receive a signal in a first frequency band and is placed on an upper middle of the electronic device so as to be adjacent to a speaker, a second antenna module (e.g., the second antenna module 1020 of FIG. 10, the second antenna module 1320 of FIG. 13, or the second antenna module 1620 of FIG. 16) that includes a plurality of conductive plates configured to transmit/receive the signal in the first frequency band and is placed on an upper left of the electronic device so as to be adjacent to the side member when viewed from the back surface of the electronic device, and a third antenna module (e.g., the third antenna module 1030 of FIG. 10, the third antenna module 1330 of FIG. 13, or the third antenna module 1630 of FIG. 16) that includes a plurality of conductive plates configured to transmit/receive the signal in the first frequency band and is placed on a lower right of the electronic device so as to be adjacent to the side member when viewed from the back surface of the electronic device.

At least some of the plurality of conductive plates of the second antenna module may be disposed at the second antenna module so as to transmit/receive a wireless signal through the back plate and transmit/receive a wireless signal through a non-conductive region of the side member, and at least some of the plurality of conductive plates of the third antenna module may be disposed at the third antenna module so as to transmit/receive a wireless signal through the back plate and transmit/receive a wireless signal through a non-conductive region of the side member. The side member may include a conductive region, of which at least a portion is capable of being used as an antenna of a signal in a specified second frequency band different from the specified first frequency band, and the non-conductive region, and the speaker may output a sound through a receiver hole formed at the front plate of the electronic device.

According to an embodiment, the non-conductive region may be covered by the back plate and may not be viewable from the outside of the electronic device.

According to an embodiment, the first antenna module may be placed between the speaker and the side member and above the speaker when viewed from the back surface of the electronic device and may include a PCB including a plurality of patch-type conductive plates and a plurality of dipole-type conductive plates. For example, the plurality of patch-type conductive plates may be disposed to form a beam toward the back plate, and the plurality of dipole-type conductive plates may be disposed above the plurality of patch-type conductive plates so as to be closer to the side member than the plurality of patch-type conductive plates.

For example, a location of the plurality of dipole-type conductive plates may be placed to be higher than the conductive region of the side member, when viewing the electronic device from the back surface, such that at least a portion of a beam pattern by the plurality of dipole-type conductive plates is formed toward the front surface of the electronic device.

For example, the first antenna module may be placed between an interposer disposed on a support member within the electronic device and the back plate, such that a location of the plurality of dipole-type conductive plates of the first antenna module is higher than the conductive region of the side member.

For example, the first antenna module may include a first PCB that is placed below the speaker when viewing the electronic device from the back surface of the electronic device, and on which a plurality of patch-type conductive plates are disposed, a third PCB that is placed between the speaker and the side member and above the speaker when viewed from above the back surface of the electronic device and on which a plurality of dipole-type conductive plates are disposed, and a second PCB that physically connects one end of the first PCB and one end of the third PCB over the speaker and electrically connects the first PCB and the third PCB. The first PCB may be placed within the electronic device such that one surface of the first PCB, on which the plurality of patch-type conductive plates are disposed, is substantially parallel to the back plate. The third PCB may be extended from the one end connected with the second PCB toward the front surface of the electronic device and may be placed within the electronic device so as to be substantially perpendicular to the back plate.

For example, the plurality of dipole-type conductive plates disposed at the third PCB may be disposed to form a beam toward the front surface of the electronic device from the one end of the third PCB, which is connected with the second PCB. At least some beams by the dipole-type conductive plates may be formed toward the front surface of the electronic device through a remaining region of the front plate of the electronic device other than the display.

According to an embodiment, the second antenna module may be placed between a camera module of the electronic device and the side member so as to be adjacent to the side member, when viewing the electronic device from the back surface of the electronic device, and the third antenna module may be placed on a right side of the electronic device and between a battery of the electronic device and the side member, when viewing the electronic device from the back surface of the electronic device.

For example, each of the second antenna module and the third antenna module may include at least one PCB where a plurality of patch-type conductive plates and a plurality of dipole-type conductive plates are disposed. The plurality of patch-type conductive plates may be disposed to form a beam toward the back plate, and the plurality of dipole-type conductive plates may be disposed above the plurality of patch-type conductive plates so as to be closer to the side member than the plurality of patch-type conductive plates.

For example, each of the second antenna module and the third antenna module may include a first PCB where the plurality of patch-type conductive plates are disposed and a second PCB where the plurality of dipole-type conductive plates are disposed. The first PCB may be placed within the electronic device such that one surface of the first PCB where the plurality of patch-type conductive plates are disposed is substantially parallel to the back plate, and the second PCB may be extended from one end of the one surface of the first PCB toward the side member and may include a curved portion, of which at least a portion has a shape of being bent from the one surface of the first PCB toward the front surface of the electronic device, and a fill cut region extended from a region, in which the plurality of dipole-type conductive plates are disposed, toward the side member. The fill cut region may be formed of a non-conductive material.

According to embodiments of the disclosure, an electronic device may provide a null point free coverage by using a plurality of antenna modules disposed to have an optimized coverage.

According to embodiments of the disclosure, the electronic device may include an antenna module disposed to minimize an interference with another antenna and may thus support legacy mobile communication and 5G mobile communication at the same time.

Besides, a variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display disposed on a front surface of the electronic device and a front plate disposed on the display;
    a back plate disposed on a back surface of the electronic device;
    a side member placed between the front plate and the back plate and forming an outer appearance of the electronic device together with the front plate and the back plate;
    a first antenna module including a plurality of first patch antenna elements and a plurality of first dipole antenna elements configured to transmit/receive a signal in a first frequency band, and placed adjacent to the side member and on an upper portion of the electronic device such that the plurality of first patch antenna elements face the back plate;
    a second antenna module including a plurality of second patch antenna elements configured to transmit/receive the signal in the first frequency band, and placed adjacent to the side member such that the plurality of second patch antenna elements face a left side of the electronic device when viewing the electronic device from the back surface; and a third antenna module including a plurality of third patch antenna elements configured to transmit/receive the signal in the first frequency band, and placed adjacent to the side member such that the plurality of third patch antenna elements face a right side of the electronic device when viewing the electronic device from the back surface.

2. The electronic device of claim 1, further comprising:
a speaker placed on an upper middle of the electronic device, and configured to output a sound through a receiver hole formed on the front plate of the electronic device,
wherein the first antenna module is placed on a right side of the speaker when viewing the electronic device from the back surface.

3. The electronic device of claim 2,
wherein the plurality of first patch antenna elements are disposed to face the back plate such that a wireless signal is transmitted/received through the back plate,
wherein the plurality of first dipole antenna elements are disposed to transmit/receive a wireless signal through the back plate and a non-conductive region of the side member,
wherein the side member includes a conductive region, of which at least a portion is capable of being used as an antenna of a signal in a second frequency band different from the first frequency band, and the non-conductive region, and
wherein the non-conductive region is covered by the back plate and is not viewable from the outside of the electronic device.

4. The electronic device of claim 3, wherein the plurality of first dipole antenna elements are placed to be higher than the conductive region of the side member adjacent to the first antenna module when viewing the electronic device from the back surface, such that at least a portion of a beam pattern by the plurality of first dipole antenna elements is formed toward the front surface of the electronic device.

5. The electronic device of claim 4, wherein the first antenna module is placed between an interposer disposed on a support member within the electronic device and the back plate.

6. The electronic device of claim 4, further comprising:
a connection member electrically connecting the conductive region of the side member adjacent to the first antenna module with a ground region placed within the electronic device,
wherein the connection member is placed between the first antenna module and the side member and above the first antenna module, and
wherein a contact of the connection member and the side member is formed at a location lower than the first antenna module when viewing the electronic device from the back surface.

7. The electronic device of claim 2,
wherein the first antenna module includes a printed circuit board including a first surface having a long axis and a short axis and a second surface facing away from the first surface,
wherein the plurality of first patch antenna elements are disposed on the first surface along a direction of the long axis,
wherein the plurality of first dipole antenna elements are disposed in a fill cut region of the printed circuit board along the direction of the long axis, and
wherein the fill cut region is formed of a non-conductive material.

8. The electronic device of claim 2, wherein the first antenna module is disposed such that at least a portion of the first antenna module overlaps the speaker when viewed from the right side or the left side of the electronic device.

9. The electronic device of claim 1, wherein the second antenna module is mounted in the electronic device such that the plurality of second patch antenna elements are substantially perpendicular to the back plate and is placed adjacent to the side member and on an upper left of the electronic device when viewing the electronic device from the back surface.

10. The electronic device of claim 9,
wherein the plurality of second patch antenna elements are disposed to transmit/receive a wireless signal through the back plate and a non-conductive region of the side member,
wherein the side member includes a conductive region, of which at least a portion is capable of being used as an antenna of a signal in a second frequency band different from the first frequency band, and the non-conductive region, and
wherein the non-conductive region is covered by the back plate and is not viewable from the outside of the electronic device.

11. The electronic device of claim 10, further comprising:
a connection member electrically connecting the conductive region of the side member adjacent to the second antenna module with a ground region placed within the electronic device,
wherein the connection member is placed on a right side of the second antenna module when viewing the electronic device from the back surface, and
wherein a contact of the connection member and the side member is formed on the right side of the second antenna module when viewing the electronic device from the back surface.

12. The electronic device of claim 1, wherein the third antenna module is mounted in the electronic device such that the plurality of third patch antenna elements are substantially perpendicular to the back plate and is placed at the right side of the electronic device and between a battery of the electronic device and the side member when viewing the electronic device from the back surface.

13. The electronic device of claim 12,
wherein the plurality of third patch antenna elements are disposed to transmit/receive a wireless signal through the back plate and a non-conductive region of the side member,
wherein the side member includes a conductive region, of which at least a portion is capable of being used as an antenna of a signal in a second frequency band different from the first frequency band, and the non-conductive region, and
wherein the non-conductive region is covered by the back plate and is not viewable from the outside of the electronic device.

14. The electronic device of claim 13, further comprising:
contacts electrically connecting an upper portion and a lower portion of the conductive region of the side member adjacent to the third antenna module with a ground region placed within the electronic device, when viewed from the back surface of the electronic device.

15. An electronic device comprising:
a display disposed on a front surface of the electronic device and a front plate disposed on the display;

a back plate disposed on a back surface of the electronic device;

a side member placed between the front plate and the back plate and forming an outer appearance of the electronic device together with the front plate and the back plate;

a first antenna module including a plurality of first patch antenna elements and a plurality of first dipole antenna elements configured to transmit/receive a signal in a first frequency band, and placed adjacent to a speaker placed on an upper middle of the electronic device when viewed from the back surface of the electronic device;

a second antenna module including a plurality of second patch antenna elements configured to transmit/receive the signal in the first frequency band, and placed adjacent to the side member and on an upper left of the electronic device when viewed from the back surface of the electronic device; and a third antenna module including a plurality of third patch antenna elements configured to transmit/receive the signal in the first frequency band, and placed on a lower right of the electronic device and between a battery and the side member when viewing the electronic device from the back surface, wherein the plurality of second patch antenna elements are disposed to transmit/receive a wireless signal toward a left side of the electronic device when viewing the electronic device from the back surface, and wherein the plurality of third patch antenna elements are disposed to transmit/receive a wireless signal toward a right side of the electronic device when viewing the electronic device from the back surface.

16. The electronic device of claim 15,
wherein the side member includes a conductive region, which is used as an antenna of a wireless signal in a second frequency band different from the first frequency band, and a non-conductive region, and wherein the non-conductive region is covered by the back plate and is not viewable from the outside of the electronic device.

17. The electronic device of claim 16, wherein the conductive region of the side member is adjacent to the first antenna module and is relatively lower than the first antenna module, when viewing the electronic device from the back surface, such that at least a portion of a beam pattern by the plurality of first dipole antenna elements is formed toward the front surface of the electronic device.

18. The electronic device of claim 15,
wherein the plurality of first patch antenna elements are disposed to transmit/receive a wireless signal through the back plate, wherein the plurality of first dipole antenna elements are disposed to transmit/receive a wireless signal through the back plate and a non-conductive region of the side member, wherein the plurality of second patch antenna elements are disposed to transmit/receive a wireless signal through the non-conductive region of the side member and the back plate, and wherein the plurality of third patch antenna elements are disposed to transmit/receive a wireless signal through the non-conductive region of the side member and the back plate.

19. The electronic device of claim 18, wherein the first antenna module is placed between an interposer disposed on a support member within the electronic device and the back plate.

20. The electronic device of claim 18, wherein contacts electrically connecting the side member with a ground in the electronic device are placed at a conductive region of the side member adjacent to the first antenna module, a conductive region of the side member adjacent to the second antenna module, and a conductive region of the side member adjacent to the third antenna module.

* * * * *